United States Patent
Hack et al.

(10) Patent No.: US 9,963,079 B2
(45) Date of Patent: May 8, 2018

(54) TRAILER COMPONENT HOLDER AND ASSEMBLY

(71) Applicant: GR INNOVATIONS LLC, Waterford, MI (US)

(72) Inventors: Gregory D. Hack, Waterford, MI (US); Rebecca A. Hack, Waterford, MI (US)

(73) Assignee: GR INNOVATIONS LLC, Waterford, MI (US)

( * ) Notice: Subject to any disclaimer, the term of this patent is extended or adjusted under 35 U.S.C. 154(b) by 128 days.

(21) Appl. No.: 14/990,302

(22) Filed: Jan. 7, 2016

(65) Prior Publication Data

US 2017/0197555 A1    Jul. 13, 2017

(51) Int. Cl.
| | | |
|---|---|---|
| *B60D 1/18* | (2006.01) | |
| *B60R 9/06* | (2006.01) | |
| *B62D 63/08* | (2006.01) | |
| *B60D 1/58* | (2006.01) | |

(52) U.S. Cl.
CPC ............. *B60R 9/06* (2013.01); *B60D 1/187* (2013.01); *B60D 1/58* (2013.01); *B62D 63/08* (2013.01)

(58) Field of Classification Search
CPC . B60D 1/187; B60D 1/18; B60D 1/36; B60D 1/62; B60D 1/665
See application file for complete search history.

(56) References Cited

U.S. PATENT DOCUMENTS

| | | | | |
|---|---|---|---|---|
| 2,998,982 A * | 9/1961 | Brazil | ............. | B60D 1/28 280/457 |
| 3,132,878 A * | 5/1964 | De Puydt | ............. | B60D 1/28 24/116 R |
| 3,458,173 A * | 7/1969 | Kornovich | ............. | B60S 9/08 254/103 |
| 3,649,049 A * | 3/1972 | Woodke, III | ............. | B60D 1/56 280/457 |
| 3,764,109 A * | 10/1973 | Hollis, Jr. | ............. | B60S 9/08 254/100 |
| 3,827,722 A * | 8/1974 | Miller | ............. | B60D 1/28 280/432 |
| 4,467,598 A * | 8/1984 | Wells | ............. | B60D 1/28 188/371 |
| 4,537,416 A * | 8/1985 | Linaburg | ............. | B60D 1/42 254/420 |
| 4,911,460 A * | 3/1990 | DePaula | ............. | B60D 1/36 254/120 |
| 5,009,444 A * | 4/1991 | Williams, Jr. | ............. | B60D 1/36 254/420 |
| 5,082,217 A * | 1/1992 | Parker | ............. | F16L 3/003 248/75 |

(Continued)

*Primary Examiner* — Kevin Hurley
*Assistant Examiner* — Michael R Stabley
(74) *Attorney, Agent, or Firm* — Fishman Stewart PLLC

(57) ABSTRACT

A holder and system for holding or retaining trailer components, such as trailer chains and/or electrical components, is disclosed. In an embodiment, a holder includes a first portion and a second portion configured for connection to the first portion. In an embodiment, the holder comprises first and second portion that are configured to form an opening that encircles a portion, such as a shaft, of a trailer lift. An embodiment of a system for holding or retaining trailer components may include trailer lift and a holder portion that extends outwardly from a portion of the trailer lift.

20 Claims, 19 Drawing Sheets

(56) References Cited

U.S. PATENT DOCUMENTS

| | | | | |
|---|---|---|---|---|
| 5,174,550 A * | 12/1992 | Pittman | | B66F 3/08 |
| | | | | 254/420 |
| 5,362,084 A * | 11/1994 | Edwards | | B60D 1/28 |
| | | | | 280/432 |
| 5,893,575 A * | 4/1999 | Larkin | | B60D 1/06 |
| | | | | 280/417.1 |
| 5,918,896 A * | 7/1999 | Jenkins, Jr. | | B60D 1/06 |
| | | | | 280/457 |
| 6,179,317 B1 * | 1/2001 | Hurst | | B60D 1/28 |
| | | | | 280/457 |
| 6,279,939 B1 * | 8/2001 | Austin | | B60D 1/18 |
| | | | | 280/432 |
| 6,622,646 B1 * | 9/2003 | Bennett | | A01B 71/08 |
| | | | | 111/200 |
| 6,644,679 B1 * | 11/2003 | Warren | | B60D 1/18 |
| | | | | 280/456.1 |
| 6,990,745 B1 * | 1/2006 | Schoenenberger | | B60D 1/36 |
| | | | | 280/477 |
| 7,637,525 B2 * | 12/2009 | Rightmire | | B60D 1/00 |
| | | | | 280/480 |
| 8,181,983 B2 * | 5/2012 | Walstrom | | B60S 9/21 |
| | | | | 254/419 |
| 8,235,410 B2 * | 8/2012 | Weber | | B60D 1/167 |
| | | | | 280/457 |
| 8,348,241 B2 * | 1/2013 | Trowbridge | | B60D 1/06 |
| | | | | 254/418 |
| 8,668,173 B2 * | 3/2014 | Knobloch | | A01C 23/008 |
| | | | | 248/68.1 |
| 8,733,779 B2 * | 5/2014 | Arakelian | | B60D 1/665 |
| | | | | 280/475 |
| 8,882,132 B2 * | 11/2014 | McCoy | | B60D 1/187 |
| | | | | 280/457 |
| 8,955,864 B2 * | 2/2015 | Palen | | F16L 3/003 |
| | | | | 280/420 |
| 9,004,520 B2 * | 4/2015 | Madison | | B60D 1/40 |
| | | | | 280/477 |
| 9,079,465 B1 * | 7/2015 | Sanftleben | | B60D 1/605 |
| 2005/0039309 A1 * | 2/2005 | McCauley | | B60D 1/18 |
| | | | | 24/299 |
| 2008/0238036 A1 * | 10/2008 | Baum | | B60D 1/18 |
| | | | | 280/477 |

* cited by examiner

TRAILER COMPONENT HOLDER AND ASSEMBLY

TECHNICAL FIELD

The present disclosure relates to a holder and system for storing trailer components, including a holder and system for storing trailer chains and/or electrical plugs while the trailer chains and/or electrical plugs are not in use.

BACKGROUND

Various trailers, such as, by way of non-limiting example, flat-bed trailers, utility trailers, travel trailers, are typically coupled via a trailer tongue to a towing hitch associated with a towing vehicle. The towing hitch may include a ball hitch that is received in a ball receiver associated with the trailer tongue. Additionally, the trailer tongue may include one or more secondary connecting components, such as, by way of non-limiting example, trailer chains and/or an electrical plug.

While the trailer is being towed, the secondary connecting components may couple and/or connect the trailer to a portion of the towing hitch. By way of non-limiting example, an attachment portion of each of the one or more trailer chains may be received by a portion of a towing hitch. The attachment portion may be a hook or a clasp that is configured to be received by an aperture disposed on the portion of the towing hitch. The one or more trailer chains may act as a safety feature of the trailer. The one or more trailer chains may act to secure the trailer to the towing vehicle if the ball hitch is dislodged from the ball receiver.

The towing vehicle may include a wiring harness. The wiring harness may be configured to receive an electrical plug associated with the trailer. The wiring harness and the electrical plug may cooperatively operate to synchronize various lights on the towing vehicle with various lights on the trailer. For example, the wiring harness and electrical plug may cooperate to synchronize turn indicator lights and break lights on the towing vehicle with turn indicator lights and break lights on the trailer.

When the secondary connecting components of the trailer are not in use, the secondary connecting components may drag or lay on the ground. For example, one or more trailer chains may drag on the ground when the trailer is being towed and the one or more trailer chains are not coupled to the towing vehicle. Additionally, the one or more trailer chains may lay on the ground when the trailer is not being towed. Similarly, the electrical plug may drag on the ground when the trailer is being towed and the electrical plug is not connected to the wiring harness and/or lay on the ground when the trailer is not being towed. The secondary connecting components may become damaged as a result of exposure to dirt, moisture, or friction from laying on the ground and/or being dragged on the ground. Additionally, the secondary connecting components may have to be lifted off of the ground in order to couple and/or connect them to the towing vehicle. Accordingly, a system for storing the secondary connecting components while the secondary connecting components are not in use may be desirable.

SUMMARY

A holder for holding or retaining trailer components includes a first portion configured to receive a secondary connecting component of a trailer, a second portion including at least one recess configured to engage at least a portion of the first portion, and a plurality of connectors configured to connect the second portion to the first portion. The first portion and the second portion may be configured to form an aperture comprising a radiused portion disposed on one of a rear side of the first portion and a side of the second portion that faces the rear side of the first portion, the aperture being configured to enclose a lift mechanism shaft.

In another embodiment, a holder and system for holding or retaining trailer components, such as trailer chains and/or electrical components includes a first portion configured to hold and/or receive at least a portion of a secondary connecting component of a trailer; and a second portion configured for connection to the first portion. In an embodiment, the holder comprises first and second portion that are configured to form an opening that encircles a portion, such as a shaft, of a trailer lift. An embodiment of a system for holding or retaining trailer components may include trailer lift and a holder portion that extends outwardly from a portion of the trailer lift.

DETAILED DESCRIPTION

Various trailers, such as, by way of non-limiting example, flat-bed trailers, utility trailers, travel trailers, and/or other suitable types of trailers are typically coupled via a trailer tongue to a towing hitch associated with a towing vehicle. The towing hitch may include a ball hitch that is received in a ball receiver associated with the trailer tongue. Additionally, the trailer tongue may include one or more secondary connecting components, such as, by way of non-limiting example, trailer chains and/or an electrical plug.

Figure 1:
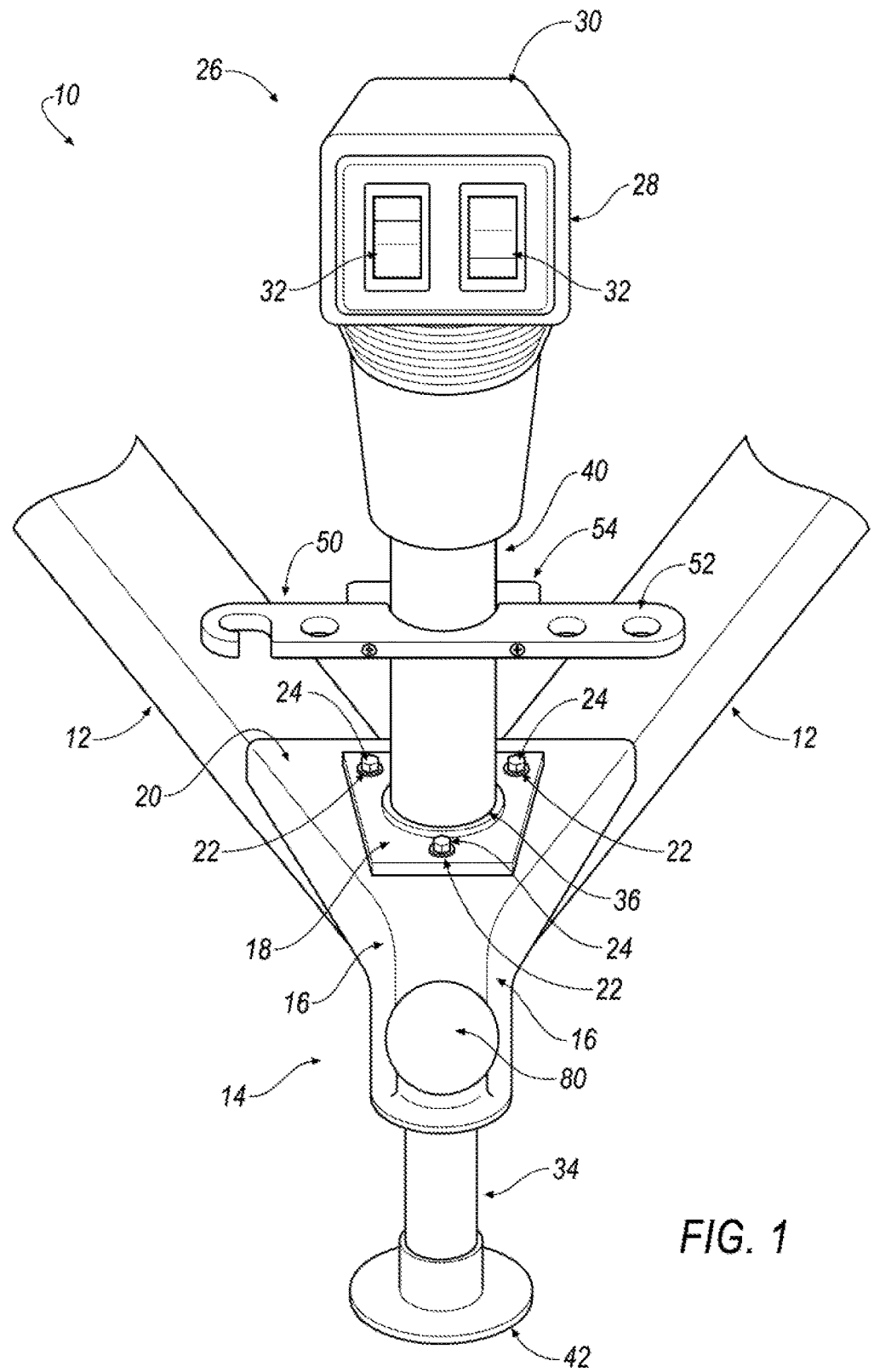
FIG. 1 generally illustrates a trailer tongue including an embodiment of a chain holder embodying principles of the present disclosure.

Referring to FIG. 1, a trailer portion 10 is generally illustrated. For example, and without limitation, trailer portion 10 may be a portion of a trailer, such as a flat-bed trailer, utility trailer, travel trailer, and/or other suitable type of trailer configured to be towed by a towing vehicle. The trailer portion 10 may comprise a front portion of the trailer. The trailer portion 10 may be configured to be attached and/or coupled to a towing vehicle.

Figure 2:
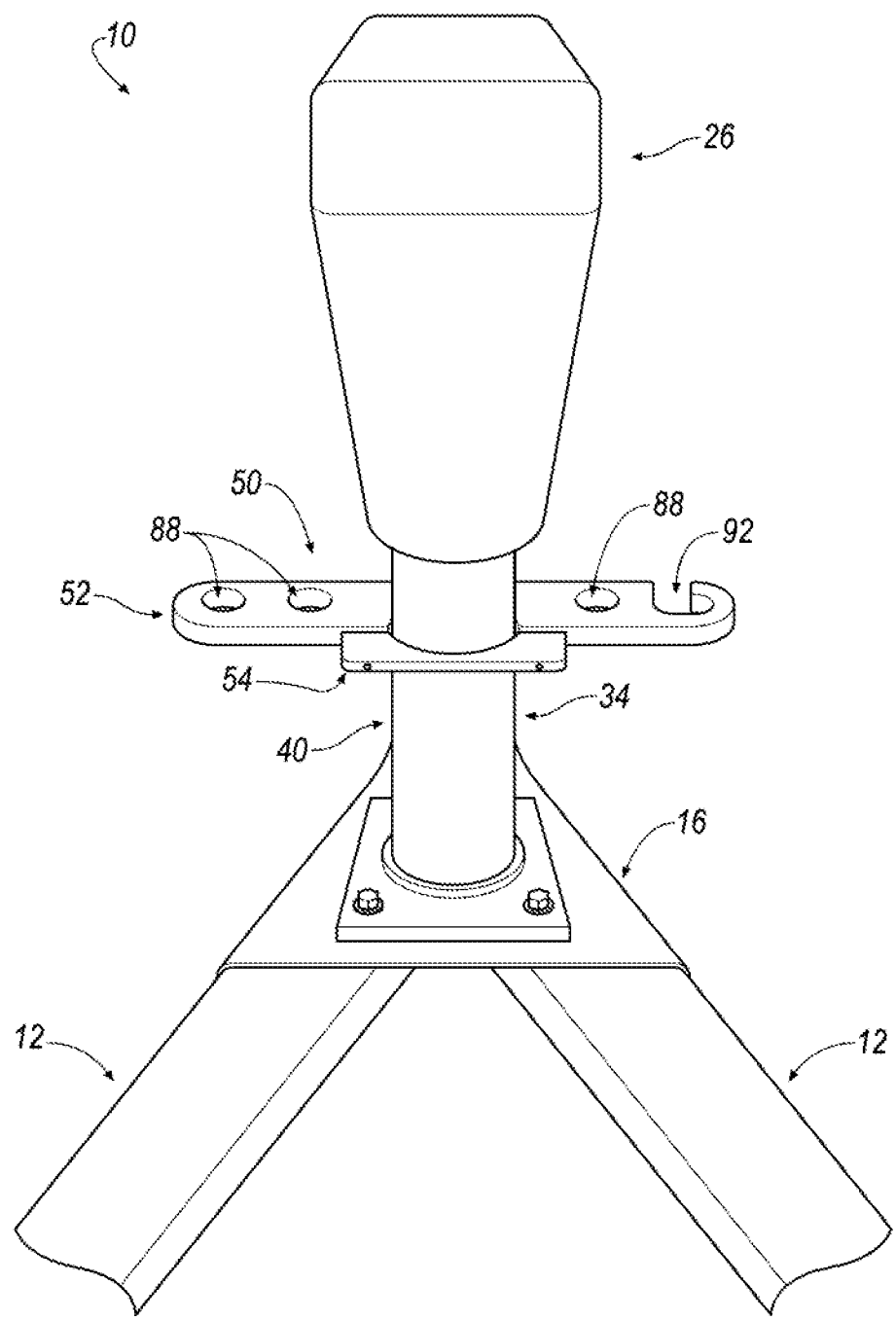
FIG. 2 generally illustrates a rear view of an embodiment of a trailer tongue including an embodiment of a chain holder embodying principles of the present disclosure.

The trailer portion 10 may include a plurality of trailer beams 12. As generally illustrated in FIGS. 1 and 2, the plurality of trailer beams 12 may be arranged in a "v-shaped" fashion. The trailer portion 10 may also include a trailer tongue 14. The tongue 14 may be configured to attach and/or couple the trailer to a towing vehicle. By way of non-limiting example, the tongue 14 may include a trailer coupler 16. The trailer coupler 16 may include coupling plate 18. The coupling plate 18 may be disposed on a top portion 20 of the trailer coupler 16. In embodiments, the coupling plate 18 may be configured to connect the plurality of beams 12 to the trailer coupler 16.

By way of non-limiting example, coupling plate 18 may be configured to receive a plurality of fasteners 22. The fasteners 22 may include, but are not limited to, bolts, screws, or other suitable fasteners. The fasteners 22 may comprise a head 24. Each of the heads 24 may be configured to receive a driving tool, such as, by way of non-limiting example, a screw driver, a socket driver, or other suitable driving tool. The driving tool may cooperatively operate with a head 24 to drive a corresponding fastener 22 into the coupling plate 18.

The coupling plate 18 may comprise a plurality of apertures or holes configured to receive a corresponding one of the plurality of fasteners 22. Additionally, the trailer coupler 16 and each of the plurality of beams 12 may comprise a plurality of apertures and/or holes that correspond and align with the apertures or holes disposed on the coupling plate 18. Each of the fasteners 22 may be inserted into a corresponding aperture disposed on the coupling plate 18. Each of the fasteners 22 may pass through apertures on each of the trailer coupler 16 and the beams 12 that correspond to the apertures on the coupling plate 18.

The fasteners 22 may comprise threads configured to receive a nut or other threaded securing device. Each of the fasteners 22 may cooperatively operate with a corresponding nut to secure the coupling plate 18 and each of the beams 12 to the trailer coupler 16. In other embodiments, one or more of the apertures disposed on the coupling plate 18, the trailer coupler 16, and/or the beams 12 may comprise threads disposed within the one or more apertures. The threads disposed within the one or more apertures may be configured to cooperatively operate with each of the fasteners 22 to secure the coupling plate 18 and the beams 12 to the trailer coupler 16.

In embodiments, the fasteners 22 may comprise a self-taping portion. For example, and without limitation, a self-taping portion may be configured to be driven, for example, by the driving tool, into the coupling plate. A self-taping portion corresponding to one of the fasteners 22 may be configured to be inserted into and/or pass through at least a portion of the coupling plate 18, the trailer coupler 16, and a corresponding beam 12 in response to a head 24 being driven by a driving tool. It should be understood that the fasteners 22 may comprise suitable fasteners that are configured to secure the coupling plate 18 to the trailer coupler 16 and each of the beams 12. In some embodiments, the coupling plate 18 may be welded to the trailer coupler 16. Additionally, the beams 12 may be welded to the trailer coupler 16. In other words, the coupling plate 18, the trailer coupler 16, and the beams 12 may be welded together.

Figure 14:
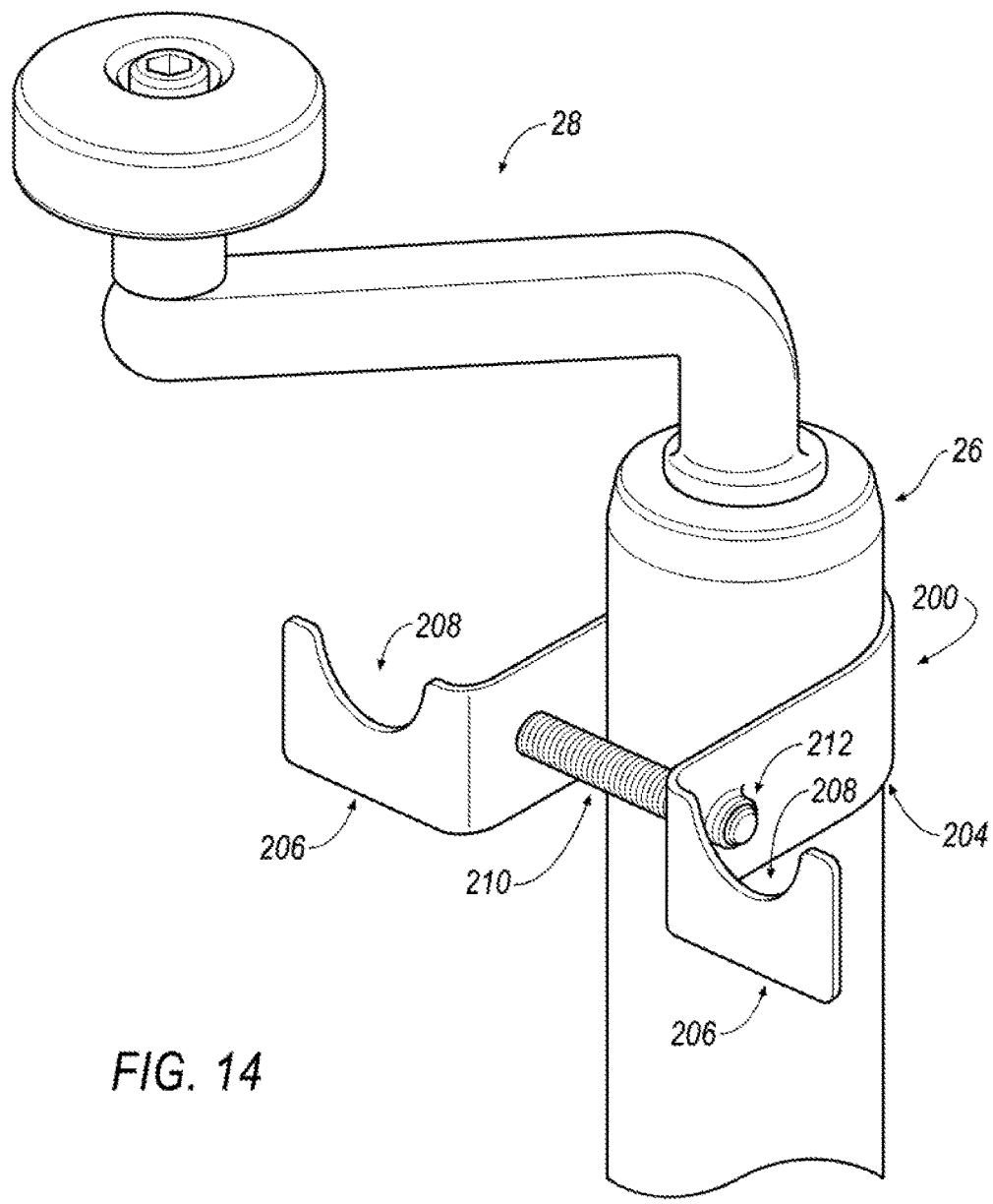
FIG. 14 generally illustrates a perspective view of a trailer lift including an embodiment of a chain holder embodying principles of the present disclosure.

The trailer portion 10 may include a trailer jack 26. The trailer jack (also referred to as a "trailer lift") 26 may be configured to raise and/or lower the trailer and/or trailer tongue 14. The trailer jack 26 may include a lift mechanism 28. In embodiments, the lift mechanism may comprise a manually operated lift, as generally illustrated in FIG. 14, or a powered lift that may comprise a motor (e.g., a motor disposed within a housing 30), as generally illustrated in FIG. 1. Embodiments of a powered lift, such as the generally illustrated trailer lift 26, may include one or more lift actuators 32. Each lift actuator 32 may comprise a button, a switch, or other suitable actuators. The one or more lift actuators 32 may be configured to selectively control the lift mechanism 28. By way of non-limiting example, a lift actuator 32 may comprise a toggle switch. The toggle switch may comprise a first or on position and a second or off position. In embodiments, when the lift actuator 32 is actuated to the first position, the lift actuator 32 may generate a first electrical signal. The motor may be configured to receive electrical signals from the lift actuator 32. The motor may turn in a first direction in response to receiving the first electrical signal.

Conversely, when a lift actuator 32 is actuated to the second position, the lift actuator 32 may generate a second electrical signal. The motor may turn in a second direction in response to receiving the second electrical signal. The trailer jack 26 may include a jack stand 34. The jack stand 34 may be in mechanical and/or operative communication with the lift mechanism 26. For example, the motor may communicate with a gear system that in turn may communicate or operate in connection with the jack stand 34. When the motor turns in the first direction, in response to receiving a first electrical signal, the gear system may be configure to lower the jack stand 34. Conversely, when the motor turns in the second direction, in response to receiving a second electrical signal, the gear system may be configured to raise the jack stand 34. In this way, the lift mechanism 28 may selectively raise and lower the jack stand 34.

It is understood that while only one lift actuator 32 is described, the lift mechanism 28 may comprise a plurality of lift actuators 32. For example, the lift mechanism 28 may comprise first and second lift actuators 32. In embodiments, the first and second lift actuators 32 may push buttons. In one example, a first lift actuator 32 may be configured to generate a first electrical signal when the first lift actuator 32 is pushed to a first or on position, indicating to the motor to lower the jack stand 34. A second lift actuator 32 may be configured to generate the second electrical signal when the second lift actuator 30 is pushed to a second or off position, indicating to the motor to raise the jack stand 34. It is understood that other suitable combinations or switches, buttons, and/or actuators may be employed in order to selectively raise and lower the jack stand 34 without deviating from the principles of the present disclosure. Further, while only an electrical lift mechanism 26 is described, a manual lift mechanism comprising a manual cranking assembly may be employed in order to raise and lower the jack stand 34 without deviating from the principles of the present disclosure.

In embodiments, the coupling plate 18 may comprise an aperture or hole 36. The aperture 36 may comprise a diameter that is slightly larger than an outer diameter of a shaft 40 of a jack stand 34. The trailer coupler 16 may comprise an aperture comprising a diameter substantially similar to the diameter of the aperture 36. The aperture 36 may be configured to allow a shaft 40 to be inserted into the coupling plate 18. Additionally, the corresponding aperture disposed on the trailer coupler 16 may be configured to allow a shaft 40 to pass through the trailer coupler 16. In this way, the jack stand 34 may pass through the trailer portion 10.

The jack stand 34 may include a foot 42. With other embodiments, the jack stand may include or comprise a ground contact wheel. The foot 42 may be configured to make contact with the ground when the jack stand 34 is lowered. In embodiments, the tongue 14 may be configured to vertically traverse the shaft 40 in response to the jack stand 34 being raised and/or lowered. By way of non-limiting example, the trailer may include a plurality of wheels disposed on a lower portion of the trailer at a predetermined distance between a rear portion of the trailer and the trailer portion 10. By way of non-limiting example, the wheels may be disposed at or near a middle second of the lower portion of the trailer.

When the jack stand 34 is lowered, a foot or a contact wheel may be lowered until the foot or wheel makes contact with the ground. As the jack stand 34 continues to be lowered, the jack stand 34 may generate a force on the foot or wheel. The ground may generate force in an opposite direction of the force generated by the jack stand 34. It can be appreciated that the force generated by the ground may cause the trailer to tilt relative to the wheels. In other words, the trailer portion 10 may be raised as the jack stand 34 is lowered. Conversely, the trailer portion 10 may be lowered as the jack stand 34 is raised until the foot 42 is lifted off of the ground. Those skilled in the art can appreciate the cooperative relationship between the trailer tongue 14 and the jack stand 34.

The trailer portion 10 may include a chain holder 50 as generally illustrated in FIG. 1. As will be described in greater detail below, the chain holder 50 may be configured to receive or hold one or more trailer chains and/or an electrical connector or plug associated with the trailer. The chain holder 50 may include a first or holding portion 52 and a second or attachment portion 54, for example, as generally illustrated in FIGS. 1 and 2.

Figure 3:
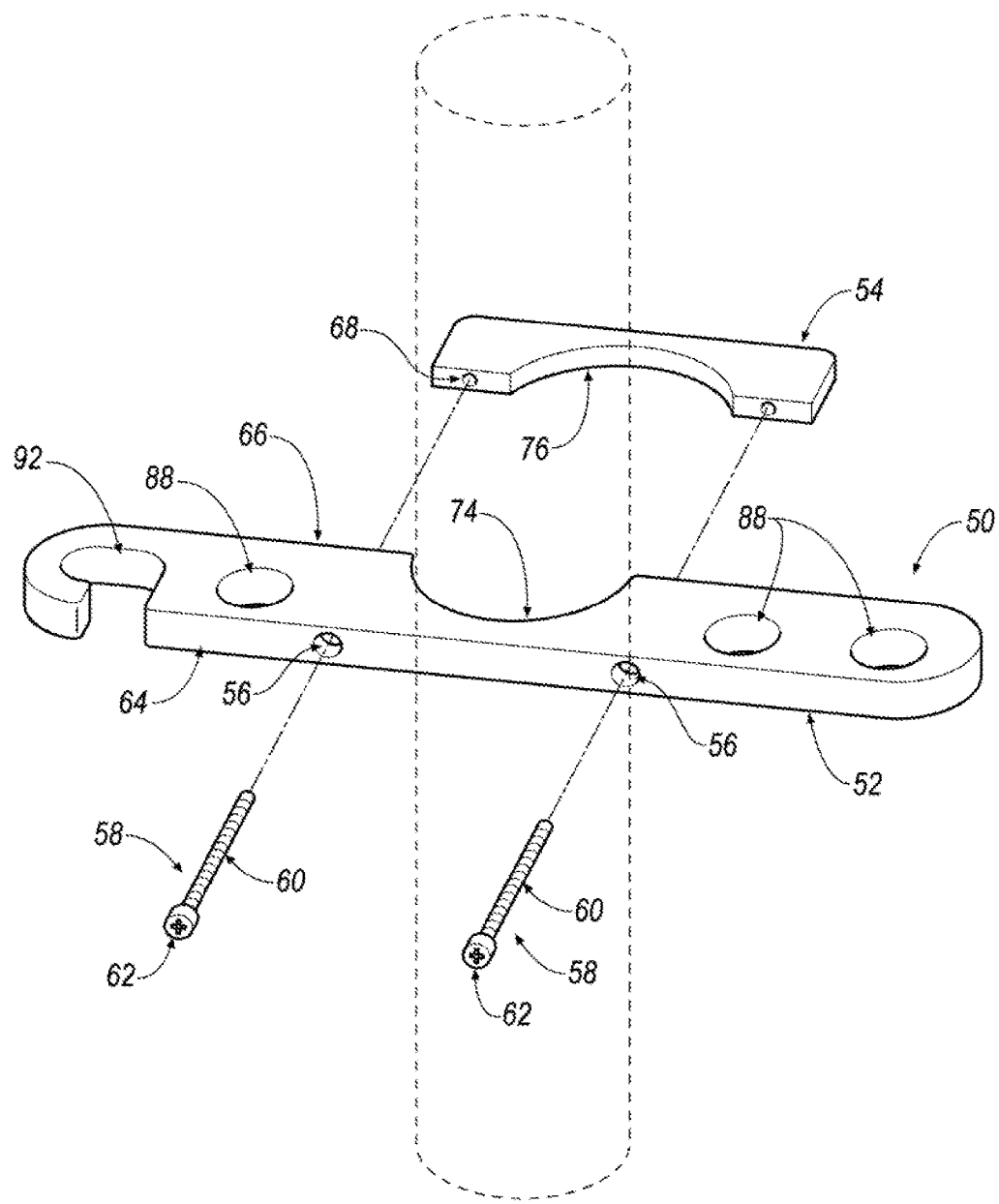
FIG. 3 generally illustrates an exploded view of an embodiment of a chain holder embodying principles of the present disclosure.

An exploded view of an embodiment of a chain holder 50 is generally illustrated in FIG. 3. In embodiments, the first portion 52 may comprise a plurality of through bores 56. The bores 56 may be configured to receive a corresponding fastener 58. The fasteners 58 may comprise a screw, bolt, or other suitable connectors. The fasteners 58 may comprise a threaded portion 60 and a head 62. In embodiments, the threaded portion 60 may be inserted into a corresponding bore 56 from a front side 64 of the holding portion 52. The threaded portion 60 may pass through the holding portion 52 and exit the corresponding bore 56 on a rear side 66 of the holding portion 52.

In embodiments, the threaded portion 60 may be received by a corresponding recess 68 disposed on an attachment portion 54. By way of non-limiting example, the recess 68 may comprise threads disposed within a recess 68. The threads disposed within a recess 68 may be configured to cooperatively operate with the threads on the threaded portion 60 to attach or secure the fastener 58 to the attachment portion 54. In embodiments, fastener 58 may be driven into the attachment portion 54 via a driving tool. For example, a corresponding head 62 may be configured to receive a driving tool. The driving tool may include, but is not limited to, a screw driver, socket driver, or other suitable driving tool. The head 62 may include a screw head, a hex head, a bolt head, or other suitable fastener heads. In embodiments, the driving tool drives the fastener 58 into the recess 68.

Figure 5:
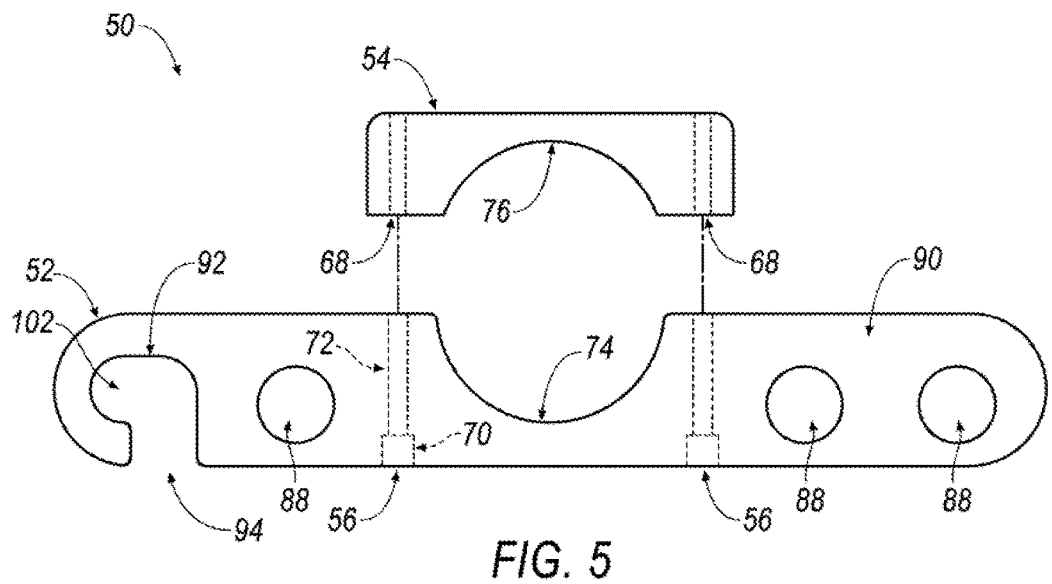
FIG. 5 generally illustrates a top view of an embodiment of a chain holder embodying principles of the present disclosure.
Figure 6:
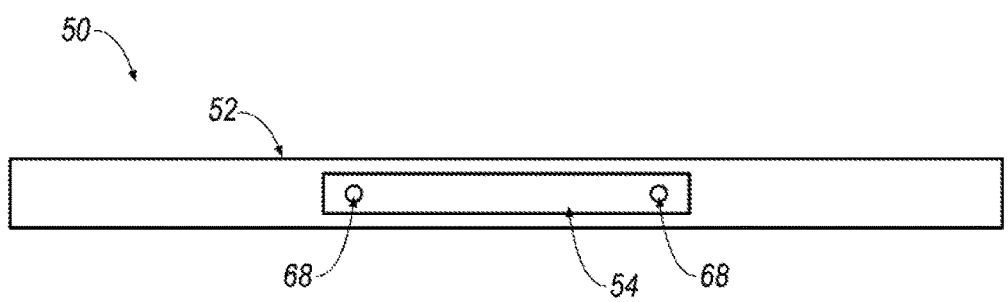
FIG. 6 generally illustrates a rear view of an embodiment of a chain holder embodying principles of the present disclosure.
Figure 7:
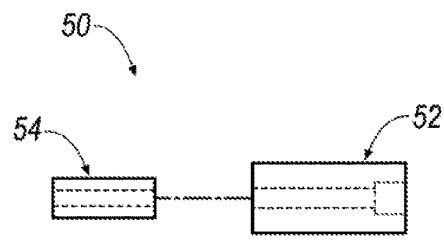
FIG. 7 generally illustrates a side view of an embodiment of a chain holder embodying principles of the present disclosure.

As generally illustrated in FIG. 5, the through bores 56 may include a first diameter 70 and a second diameter 72. By way of non-limiting example, the first diameter 70 may be slightly larger than a diameter associated with a corresponding head 62 while the second diameter 72 may be slightly larger than a diameter associated with a corresponding threaded portion 60. In other words, the second diameter 72 may be at least slightly smaller than the diameter associate with the head 62. In this way, the head 62 may be prevented from passing through the bore 56. It can be appreciated that as the head 62 is driven, the threaded portion 60 may pull the attachment portion 54 toward the holding portion 52. A rear view of an embodiment for a chain holder 50 is generally illustrated in FIG. 6, while a side view of such a chain holder 50 is generally illustrated in FIG. 7.

The holding portion 52 may include a first shaft engagement portion 74. The first shaft engagement portion 74 may comprise a half circle having a diameter that may be similar to the diameter of the shaft 40. Similarly, the attachment portion 54 may comprise a second shaft engagement portion 76. The second shaft engagement portion 76 may comprise a half circle having a diameter that is similar to the diameter of the shaft 40. In embodiments, when the fasteners 58 are inserted into corresponding bores 56 and driven into corresponding recesses 68, the first shaft engagement portion 74 and the second shaft engagement portion 76 may form an aperture having a diameter similar to the diameter of the shaft 40. Each of the fasteners 58 may be driven into corresponding recesses 68 until the holding portion 52 and the attachment portion 54 are secured to the shaft 40. As generally illustrated in FIGS. 1 and 2, the chain holder 50 may be secured to the shaft 40 below the lift mechanism 26 and above the trailer coupler 16. It is understood that the chain holder 50 may be positioned in other suitable positions or locations on or about the trailer portion 10.

Figure 10:
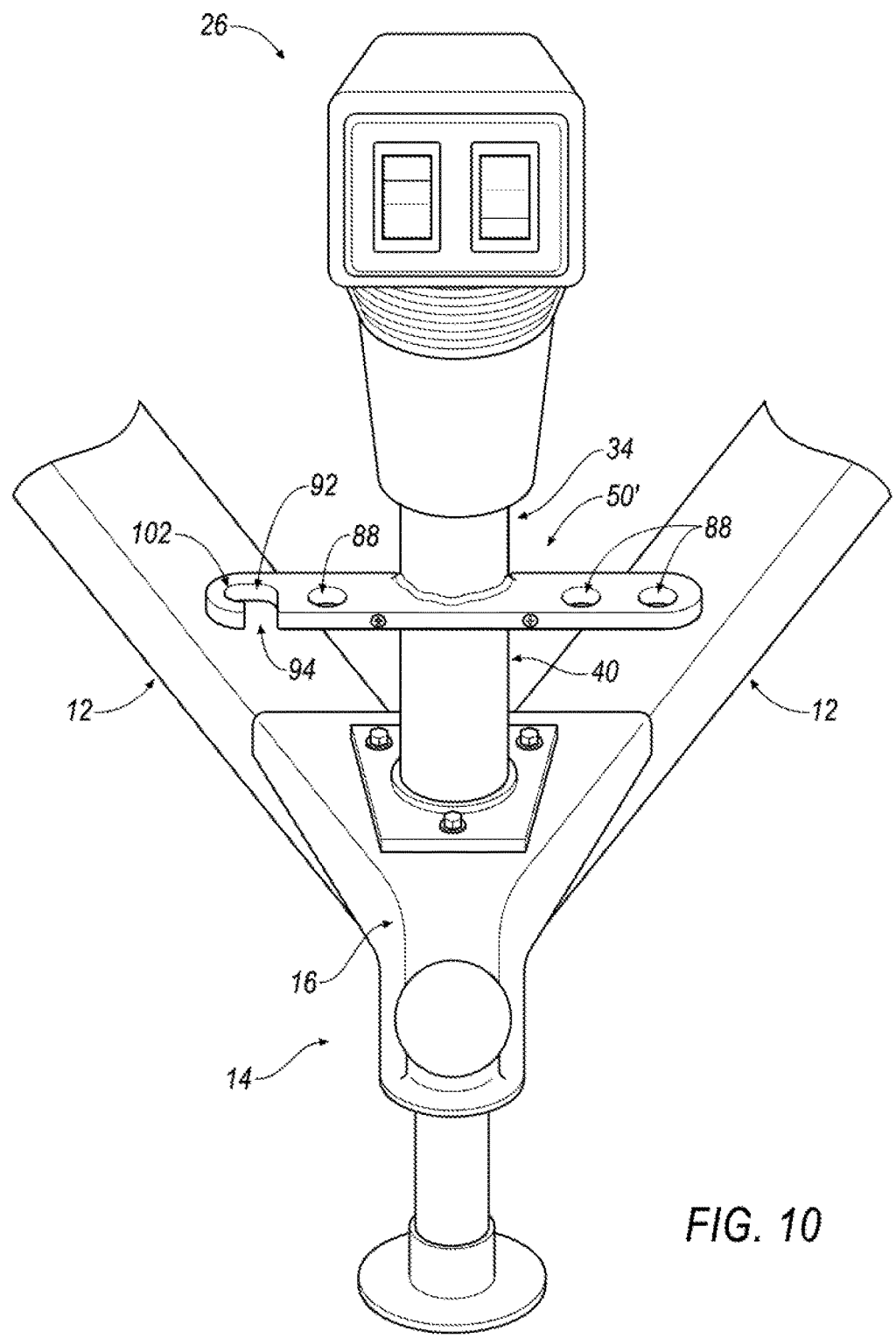
FIG. 10 generally illustrates a trailer tongue including an embodiment of a chain holder embodying principles of the present disclosure.
Figure 11:
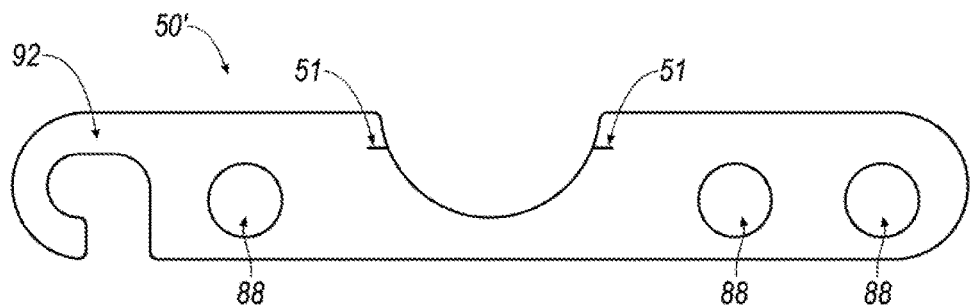
FIG. 11 generally illustrates a top view of another embodiment of a chain holder embodying principles of the present disclosure.
Figure 12:
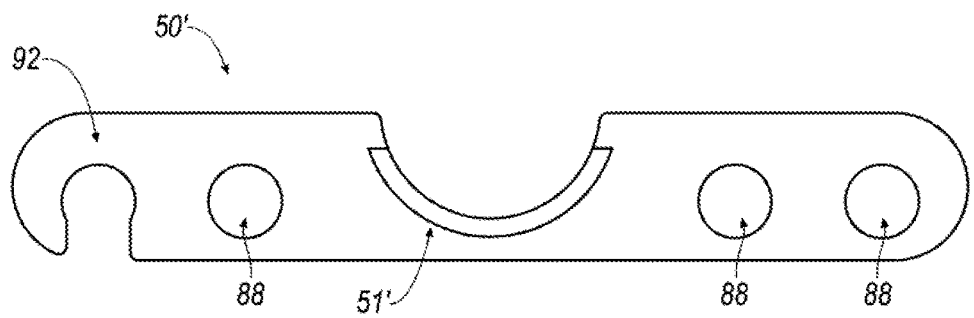
FIG. 12 generally illustrates a top view of another embodiment of a chain holder embodying principles of the present disclosure.

With reference to FIGS. 10-12, another embodiment of a chain holder 50' is generally illustrated. The chain holder 50' may include a plurality of welding tabs 51, such as generally illustrated in FIG. 11. The welding tabs 51 may be configured to rest against a portion of the shaft 40 when the chain holder 50' is positioned along the shaft 40. An amount of weld may be applied to each of the welding tabs 51. The chain holder 50' may be secured to the shaft 40 by the welding tabs 51 and the amount of weld. Additionally or alternatively, the chain holder 50' may include a welding lip 51'. The welding lip 51' may be a raised portion disposed on a top 90' of the chain holder 50'. The welding lip 51' may be configured to engage a portion of the shaft 40 when the chain holder 50' is positioned on the shaft 40. An amount of weld may be applied to the welding lip 51'. The chain holder 50' may be secured to the shaft 40 by the welding lip 51' and the amount of weld. It is understood that the chain holders 50 and 50' may also be integrated into the trailer portion 10. By way of non-limiting example, the chain holder 50' may be a cross-member portion of the shaft 40 that is manufactured into the shaft 40. In other words, the chain holder 50' and the shaft 40 may comprise a single unitary or integrated piece.

Figure 8:
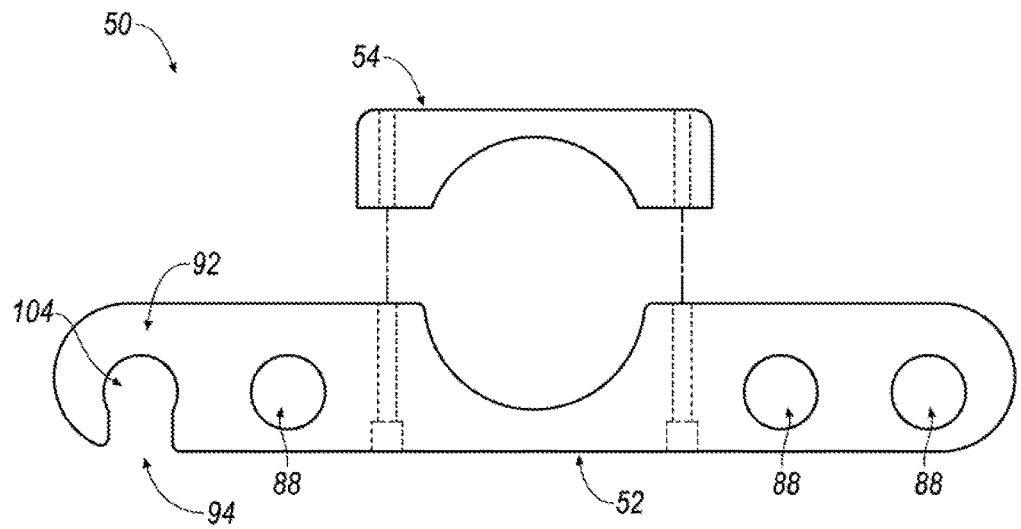
FIG. 8 generally illustrates a top view of an another embodiment of a chain holder embodying principles of the present disclosure.
Figure 9:
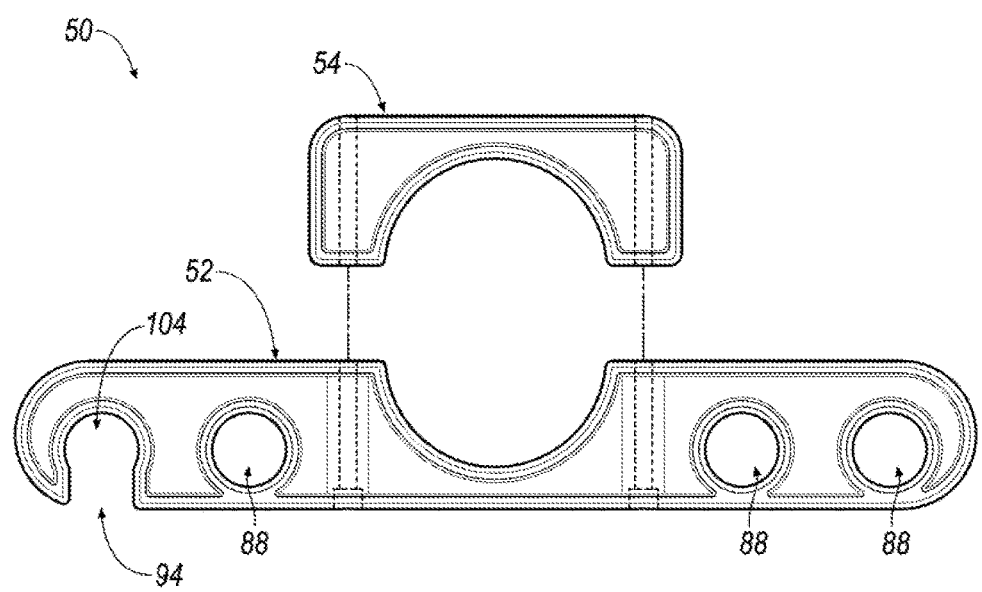
FIG. 9 generally illustrates an embodiment of a top view of another embodiment of a chain holder embodying principles of the present disclosure.

The chain holder 50 may comprise a rigid material. As generally illustrated in FIG. 8, the chain holder 50 may comprise a metal such as stainless steel or other suitable metal. In embodiments, the holding portion 52 may comprise a first material and the attachment portion 54 may comprise a second material. In some embodiments, the attachment portion 54 may be powder coated and/or dyed. In other embodiments, such as generally illustrated in FIG. 9, the chain holder 50 may comprise a polymer material. The polymer materials may include, but are not limited to, polyethylene, polypropylene, or other suitable polymer types. As illustrated the attachment portion 54 may have a thickness that is slightly less than a thickness of the holding portion 52. However, it is understood that the attachment portion 54 may comprise the same thickness or a greater thickness than the holding portion 52.

The ball receiver 80 may comprise a shape that is similar to the ball hitch. When the trailer is being towed, the ball receiver 80 may be lowered onto the ball hitch. By way of non-limiting example, the jack stand 34 may be lowered, thereby raising the tongue 14. The trailer may be positioned such that the ball receiver 80 is generally aligned with the ball hitch. The jack stand 34 may then be raised, thereby lowering the tongue 14 such that the ball receiver 80 receives the ball hitch.

Figure 4:
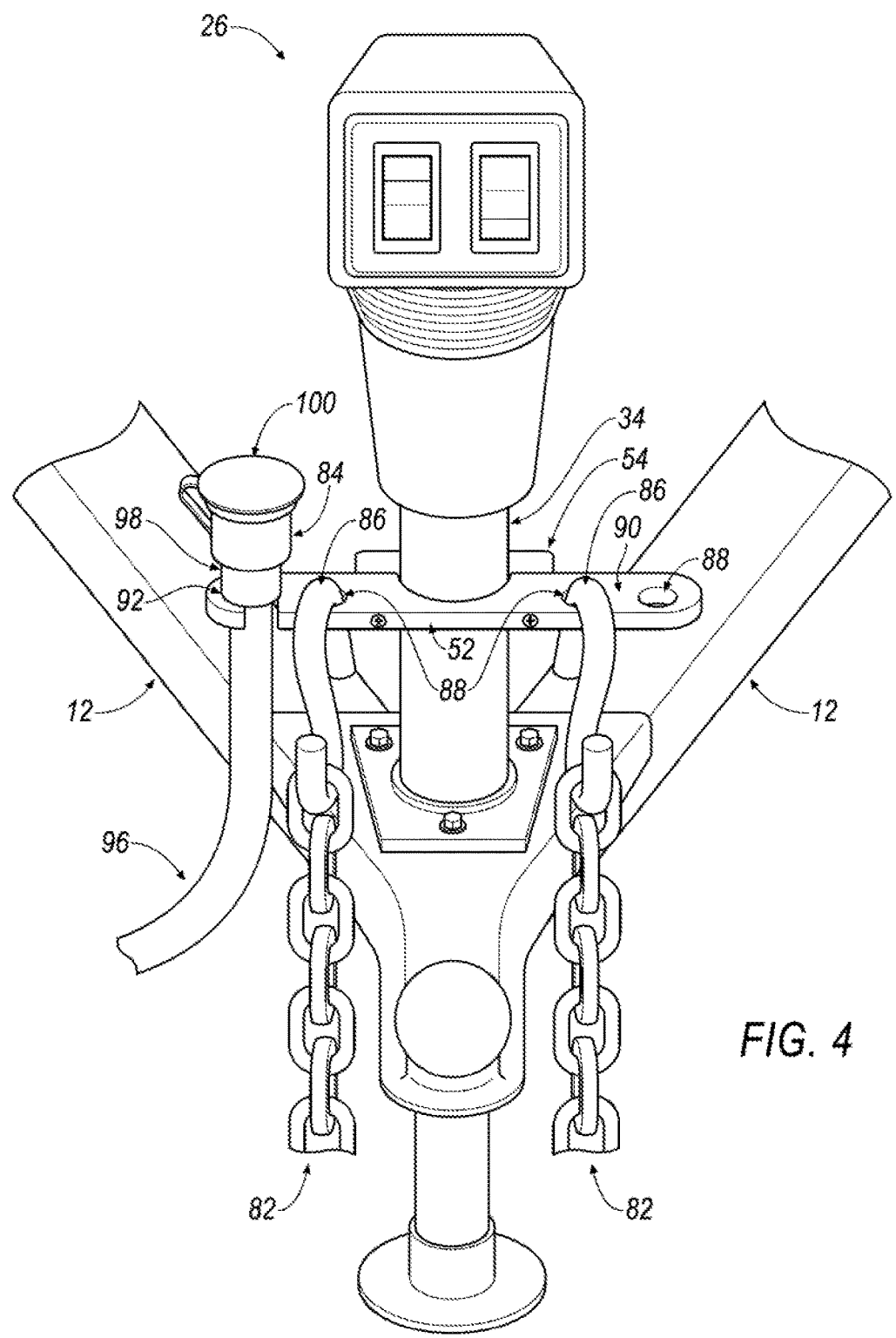
FIG. 4 generally illustrates a plurality of secondary connecting components connected to a chain holder of the type generally illustrated in FIG. 1.

As generally illustrated in FIG. 4, the trailer portion 10 may include a plurality of secondary connecting components. While the trailer is being towed, the secondary connecting components may couple and/or connect the trailer to a portion of the towing hitch. In embodiments, the secondary connecting components may include, but are not limited to, one or more trailer chains 82 and an electrical plug 84. In embodiments, each of the one or more trailer chains 82 includes a trailer end. The trailer end may be attached or connected to a portion of the trailer. By way of non-limiting example, each trailer end may be welded to, for example, a corresponding beam 12. In another example, each of the trailer ends may include a clip or hook that may be attached and/or hooked to an aperture disposed on the trailer coupler 16. It is understood that each trailer end may be attached, coupled, welded, secured, or generally associated with one or more suitable components of the trailer such that the trailer end of each of the trailer chains 82 affixed to the trailer while the trailer is being towed and/or while the trailer is not in use.

In embodiments, each of the trailer chains 82 may include an attachment portion 86. As generally illustrated in FIG. 4, the attachment portions 86 may comprise a hook or clip. However, it is understood that the attachment portions 86 may comprise other suitable attachable fixtures and/or components. The attachment portions 86 may be configured to be attached and/or hooked into an aperture or hole disposed on a portion of the towing vehicle, such as, by way of non-limiting example, a receiving aperture disposed on a surface of the towing hitch. When the trailer is attached to the towing vehicle, as described, the attachment portions 86 may be received by the receiving aperture disposed on the surface of the towing hitch.

The one or more trailer chains 82 may act as a fail-safe feature of the trailer. By way of non-limiting example, the ball hitch may become dislodged from the ball receiver 80. The one or more trailer chains 82 may act to secure the trailer to the towing vehicle when the ball hitch is dislodged from the ball receiver 80.

The electrical plug 84 may comprise a trailer end that is electrically connected to a trailer wiring harness. The trailer wiring harness may comprise a plurality of wires and/or electrical components that electrically connect various lights and/or sensors associated with the trailer to the trailer wiring harness. The electrical plug 84 may be configured to receive a portion of the towing wiring harness. By way of non-limiting example, the electrical plug 84 may comprise a female plug configured to receive a mail electrical plug associated with the towing wiring harness associated with the towing hitch. When the trailer is attached to the towing vehicle, as described, the electrical plug 84 may be electrically connected to the wiring harness associated with the towing hitch. The wiring harness associated with the towing hitch may be in electrically communication with various lights and/or sensors associated with the towing vehicle. For example, the wiring harness associated with the towing hitch may be comprised of a plurality of wires and/or electrical components associated with the various lights and/or sensors.

In embodiments, when the electrical plug 84 is connected to the wiring harness associated with the towing hitch, the various lights and/or sensors associated with the towing vehicle may be synchronized with the various lights and/or sensors associated with the trailer. In this way, various lights associated with the trailer, such as, by way of non-limiting example, turning indicator lights, brake lights, and/or tail lights may be illuminated and/or controlled by the towing vehicle. By way of non-limiting example, when the electrical plug 84 is connected to the towing wiring harness, a brake light associated with the trailer may be illuminated when a brake associated with the towing vehicle is actuated.

When the secondary connecting components, such as, the one or more trailer chains 82 and/or the electrical plug 84, of the trailer are not in use, the secondary connecting components may drag and/or lay on the ground. For example, the one or more trailer chains 82 may drag on the ground when the trailer is being towed and the one or more trailer chains 82 are not attached to the towing vehicle. Additionally or alternatively, the one or more trailer chains 82 may lay on the ground when the trailer is not being towed. Similarly, the electrical plug 84 may drag on the ground when the trailer is being towed and the electrical plug 84 is not connected to the towing wiring harness. Further, the electrical plug 84 may lay on the ground when the trailer is not being towed.

The secondary connecting components may become damaged as a result of exposure to dirt, moisture, or friction from laying on the ground and/or being dragged on the ground. By way of non-limiting example, the one or more trailer chains 82 may corrode as a result of laying on the ground after a rain fall or when the ground is generally damp. Further, the one or more trailer chains 82 may become damaged from the one or more trailer chains 82 dragging on the ground. Additionally, the electrical plug 84 may become corroded or shorted as a result of laying in water on the ground after a rail fall or due to moisture and/or dampness on the ground. Further, the secondary connecting components may have to be lifted off of the ground in order to couple and/or connect them to the towing vehicle.

As generally illustrated in FIGS. 4 and 5, the chain holder 50 may be configured to hold the one or more trailer chains 82 and/or the electrical plug 84 when the one or more trailer chains 82 and/or the electrical plug 84 are not in use. The holding portion 52 may include a plurality of holding apertures or holes 88. In embodiments, the apertures 88 may be recesses that extend partially through the first portion 52. The holding apertures 88 may be disposed on a top portion 90 of the holding portion 52. In embodiments, each of the holding apertures 88 may be disposed a predefined distance from an edge of the front side 64. By way of non-limiting example, the predefined distance may be configured to allow the attachment portions 86 to be received and/or hooked into the holding apertures 88.

The chain holder 50 may also be configured to support and/or hold the electrical plug 84. The chain holder 50 may include a portion with an open face or cutaway 92. The cutaway 92 may include a receiving portion 94 disposed on the front side 64. The receiving portion 94 may be configured to receive a portion of the electrical plug 84. By way of non-limiting example, the electrical plug 84 may include a cord portion 96 and an outlet portion 98. The cord portion 96 may comprise an electrical cord having a diameter that is slightly smaller than a size of the receiving portion 94. Additionally, the outlet portion 98 may comprise a diameter that is at least slightly larger than the size of the receiving portion 94. In this way, the cord portion 96 may be inserted into the receiving portion 94 while the outlet portion 98 may rest on the top portion 90 of the chain holder 50. Additionally or alternatively, the electrical plug 84 may include a cap 100. As generally illustrated in FIG. 4, the cap 100 may be disposed on a portion of the outlet portion 98. The cap 100 may be configure to cover female receiving portions of the electrical plug 84. In this way, the cap 100 may prevent dirt and/or moisture from entering the electrical plug 84 when the electrical plug 84 is not in use.

In embodiments, the cutaway 92 may include an electrical plug retaining portion In some embodiments, the electrical plug retaining portion may comprise an indented or generally L-shaped portion 102, as generally illustrated in FIG. 5. In other embodiments, the electrical retaining portion may comprise a relieved portion 104, as generally illustrated in FIGS. 8 and 9. The indented portion 102 may be configured to receive the cord portion 96 after the cord portion 96 is inserted into the receiving portion 94. By way of non-limiting example, the cord portion 96 may be inserted into the receiving portion 94. A force great enough to enter the receiving portion 94 may be applied to the cord portion 96. For example, the receiving portion 94 may comprise an opening size that is slightly larger than the cord portion 96. In this way, enough force may be required to push and/or insert the cord portion 96 into the cutaway 92.

The cord portion 96 may then be pushed or forced into the indented portion 102. The indented portion 102 may be disposed on either side of the receiving portion 94. The indented portion 102 may prevent or resist withdrawal of the cord portion 94 from the cutaway 92. For example, because the indented portion 102 is disposed on either side of the receiving portion 94, the cord portion 94 may be held in place by a portion of the chain holder 50. In other words, if a force is applied to the cord portion 94 and/or the electrical plug 84, the indented portion 102 may prevent the cord portion 94 from exiting the receiving portion 94. In order to remove the electrical plug 84 from the cutaway 92, the cord portion 96 may be removed from the indented portion 102 and then removed from the receiving portion 94.

As generally illustrated in FIGS. 8 and 9, the cutaway 92 may include a relieved portion 104. The relieved portion 104 may be a portion of the cutaway that may comprise at least a portion of a circle having a diameter that may be slightly larger than the receiving portion 94. Further, the relieved portion 104 may comprise a diameter that may be slightly larger than the diameter of the cord portion 96. The relieved portion 104 may allow the cord portion 96 to move within the cutaway 92. By way of non-limiting example, the electrical plug 84 may be free to move up and/or down when the cord portion 96 is inserted into the relieved portion 104.

As described with respect to the indented portion 102, the relieved portion 104 may prevent or limit withdrawal of the cord portion 96. For example, while the cord portion 96 may move freely inside of the cutaway 92, the cord portion 96 may collide with a portion of the chain holder 50 when the cord portion 96 is pushed and/or pulled toward the receiving portion 94. Removal of the cord portion 96 from the cutaway 92 may require aligning the cord portion 96 with the receiving portion 94. Further, removal of the cord portion 96 from the receiving portion 94 may require an amount of force great enough to exit the receiving portion 94.

As described, the chain holder 50 may be attached to the shaft 40 between the lift mechanism 26 and the trailer coupler 16. It is understood that while various suitable positions are may be employed without deviating from the principles of the present disclosure, the chain holder 50 may be positioned such that the one or more trailer chains 82 and/or the electrical plug 84 are lifted off of the ground.

Figure 13:
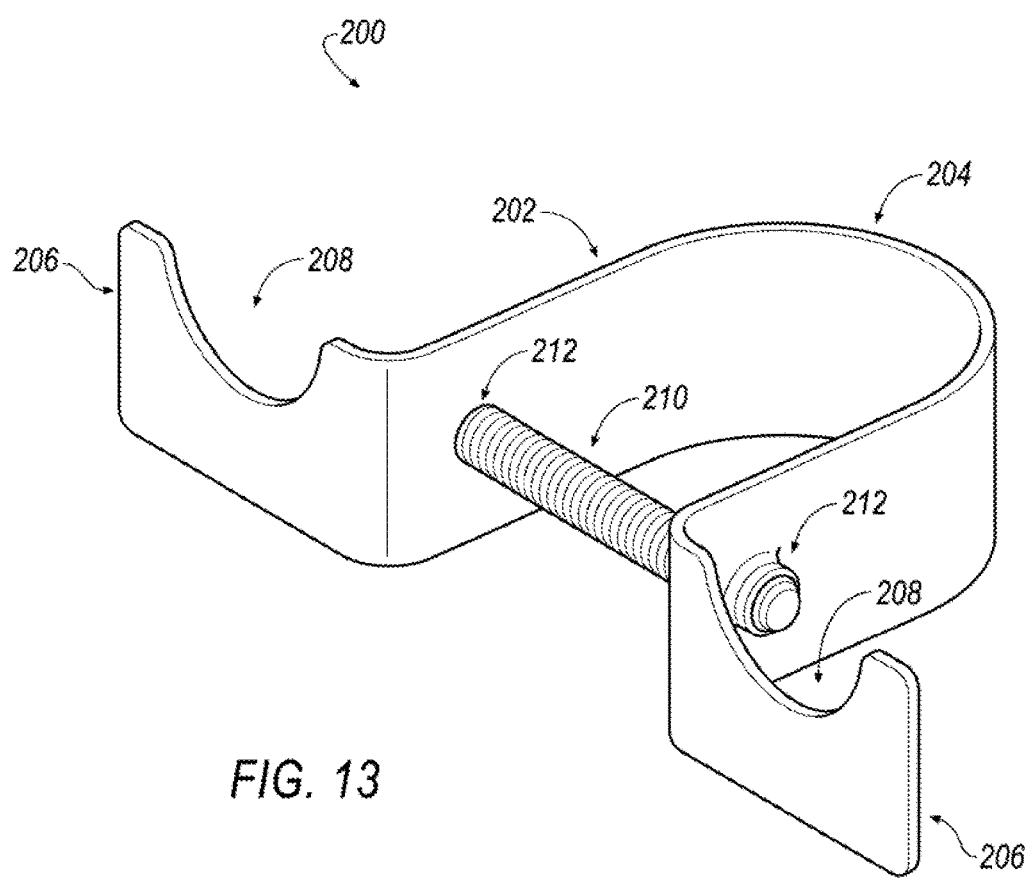
FIG. 13 generally illustrates a perspective view of another embodiment of a chain holder embodying principles of the present disclosure.

With reference to FIG. 13, an embodiment of a chain holder 200 is generally illustrated. The chain holder 200 may include a bracket 202. The bracket 202 may include a generally U-shaped or curved portion 204 and one or more flanges 206. In embodiments, the one or more flanges 206 may be disposed at opposite ends of the portion 204. In embodiments, one or more of the flanges 206 may include one or more recesses or apertures 208. One or more of the recesses 208 may be disposed on a top portion of a flange 206. In embodiments, the one or more recesses 208 may be configured to receive, hold, and/or retain a secondary connecting component of a trailer. For example, and without limitation, a recess 208 may be configured to receive at least a portion of a trailer chain. In embodiments a hook associated with a trailer chain may be hooked and/or clipped to a flange 206 via a recess 208.

The portion 204 may be configured to at least partially receive a portion of a trailer jack 26. The chain holder 200 may include one or more fasteners 210. The one or more fastener 210 may comprise a plurality of threads and/or a fastener head. In embodiments, one or more of the fastener 210 may comprise a bolt, screw, and/or other suitable fasteners. One or more of the fastener 210 may be configured to engage and/or be inserted into one or more apertures 212. In embodiments, one or more of the apertures 212 may be disposed in a side of the portion 204. In embodiments, a first aperture 212 may be disposed on a first side of the portion 204 and a second aperture 212 may be disposed on a second side of the portion 204. The first side may be opposed to the second side. One or more of the fastener 210 may be inserted into the first aperture 212. The fastener 210 may pass through the first aperture 212 and into a second aperture 212.

One or more of the fastener 210 may be configured to secure a chain holder 200 to a trailer jack 26. For example, and without limitation, a fastener 210 may be thread through a first aperture 212 and a second aperture 212. The fastener 210 may be configured to draw a first side of the portion 204 toward a second side of the portion 204. The portion 204 may pinch and/or tighten around a portion of a trailer jack 26, as generally illustrated in FIG. 14. The chain holder 200 may be secured to a the trailer jack 26 when the portion 204 is pinched and/or tightened around the portion of the trailer jack 26.

Figure 15:
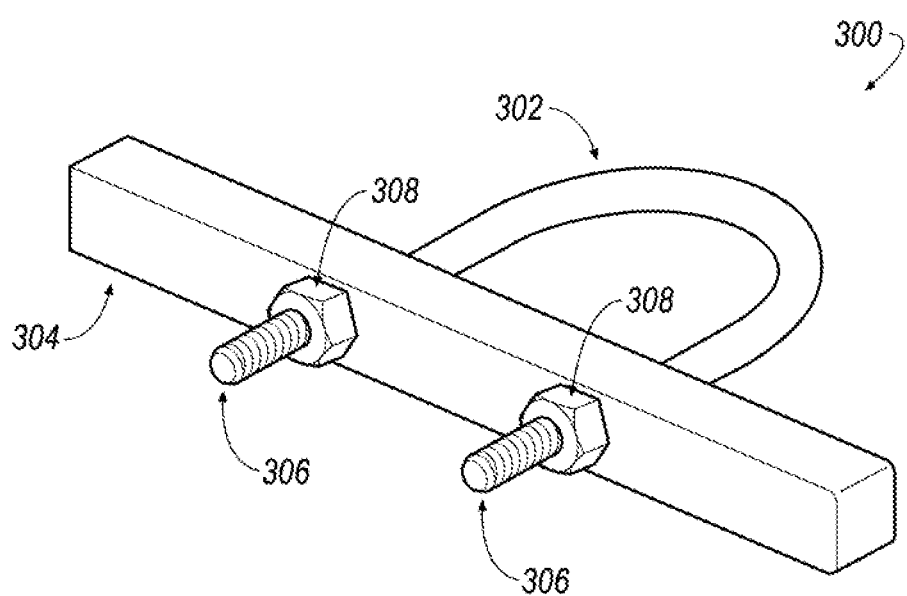
FIG. 15 generally illustrates a perspective view of an embodiment of a chain holder embodying principles of the present disclosure.

With reference to FIG. 15, an embodiment of a chain holder 300 is generally illustrated. The chain holder 300 may include a bracket 302 and a holding portion 304. The bracket 302 may comprise a generally U-shape. The bracket 302 may include a plurality of ends 306. One or more of the ends 306 may be configured to pass through a corresponding through bore or aperture associated with the holding portion 304. The holding portion 304 may comprise a generally rectangular shape. In embodiments, one or more of the ends 306 may pass through the holding portion 304 (e.g., through a bore or aperture).

Figure 16A:
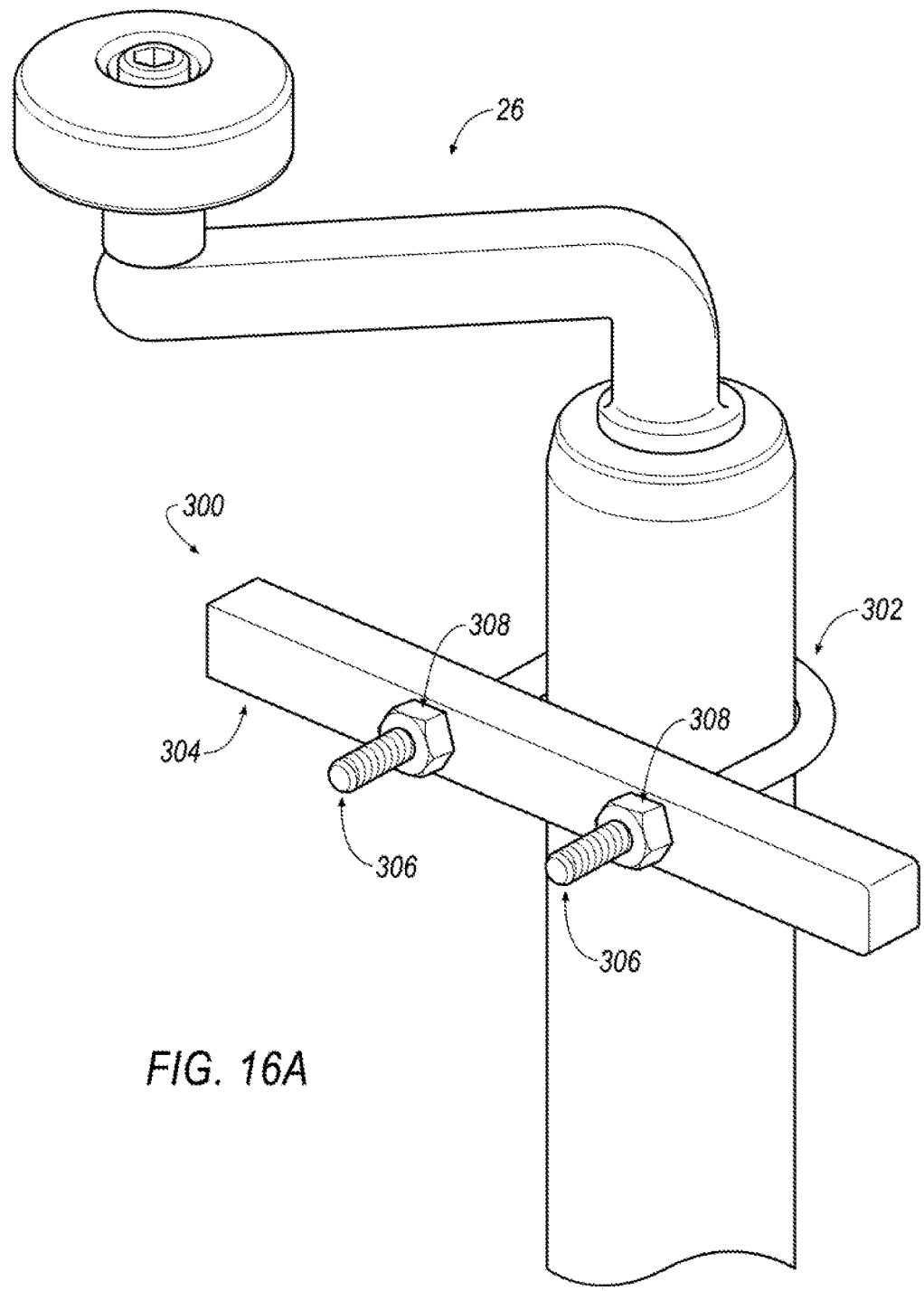
FIG. 16A generally illustrates a perspective view of a trailer lift including an embodiment of a chain holder embodying principles of the present disclosure.
Figure 16B:
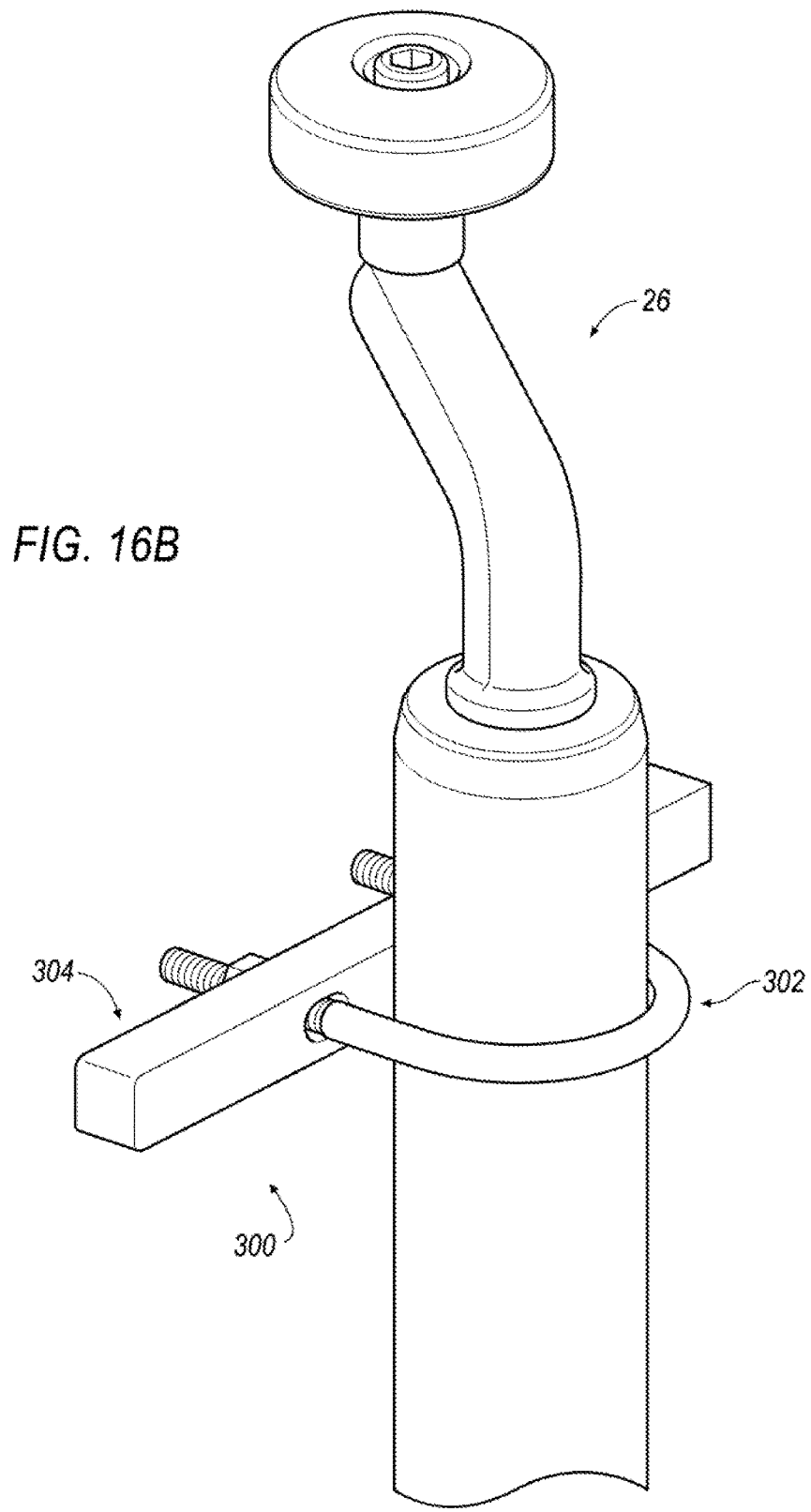
FIG. 16B generally illustrates a rear view of a trailer lift including an embodiment of a chain holder embodying principles of the present disclosure.

One or more of the ends 306 may be configured to secure the bracket 302 to the holding portion 304. For example, and without limitation, one or more of the ends 306 may be configured to receive a fastener 308. For example, and without limitation, one or more of the ends 306 may be configured to receive a bolt, screw, and/or other suitable fastener. In embodiments, one or more of the ends 306 may comprise a plurality of threads that cooperate with a corresponding fastener 308 in order to draw the bracket 302 toward the holding portion 304. As generally illustrated in FIGS. 16A and 16B, the chain holder 300 may be configured to engage and/or be secured to a trailer jack 26. For example, and without limitation, the bracket 302 may be drawn in toward the holding portion 304 until the bracket 302 pinches and/or tightens around a portion of the trailer jack 26.

Figure 17:
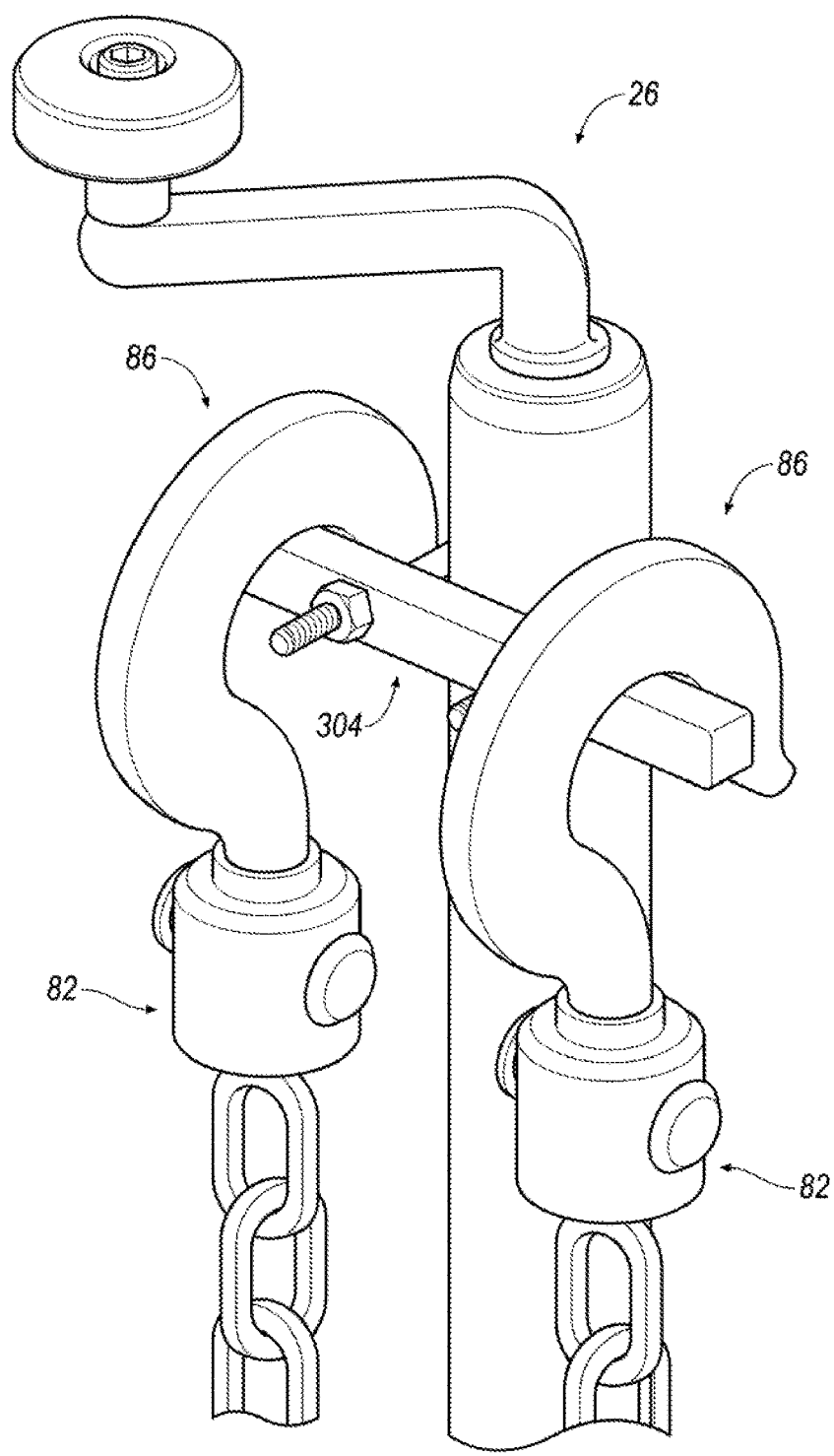
FIG. 17 generally illustrates a perspective view of a plurality of secondary connecting components connected to a chain holder of the type generally illustrated in FIG. 15.
Figure 18:
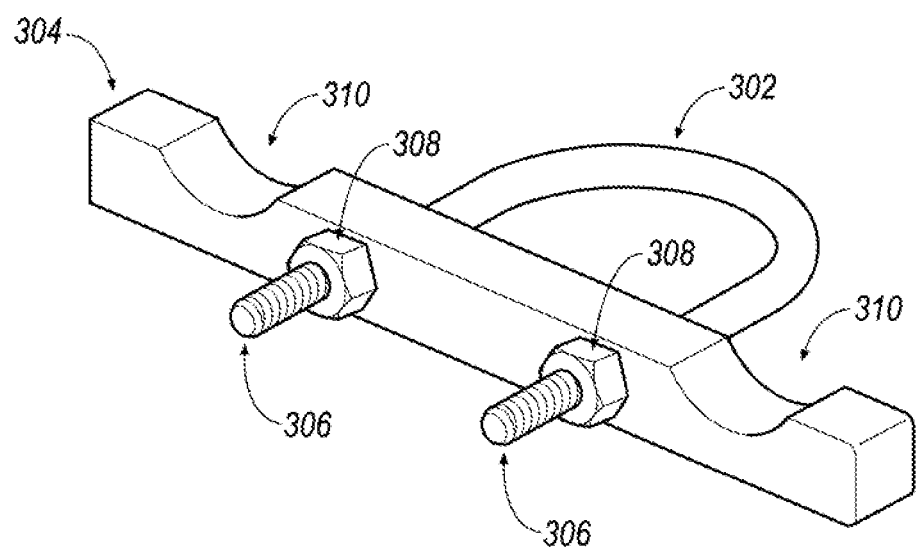
FIG. 18 generally illustrates a perspective view of an embodiment of a chain holder embodying principles of the present disclosure.

In embodiments, the chain holder 300 may be configured to hold and/or retain at least a portion of a secondary connecting component, such as is generally illustrated in FIG. 17. For example, and without limitation, the holding portion 304 may be configured to receive a portion of a trailer chain 82. In embodiments, a trailer chain 82 may include an attachment portion 86. The attachment portion 86 may include, for example, a hook or other suitable attachable portion. In embodiments, one or more attachment portions 86 may rest on a portion of the holding portion 304. In embodiments, the holding portion 304 may include one or more cutouts or recesses 310, such as is generally illustrated in FIG. 18. The recesses 310 may be configured to receive an attachment portion 86. For example, and without limitation, an attachment portion 86 may rest and/or be held within a recess 310. One or more of the recesses 310 may be configured to limit movement of an attachment portion 86 while the attachment portion 86 is at rest and/or held within a recess 310.

Figure 19:
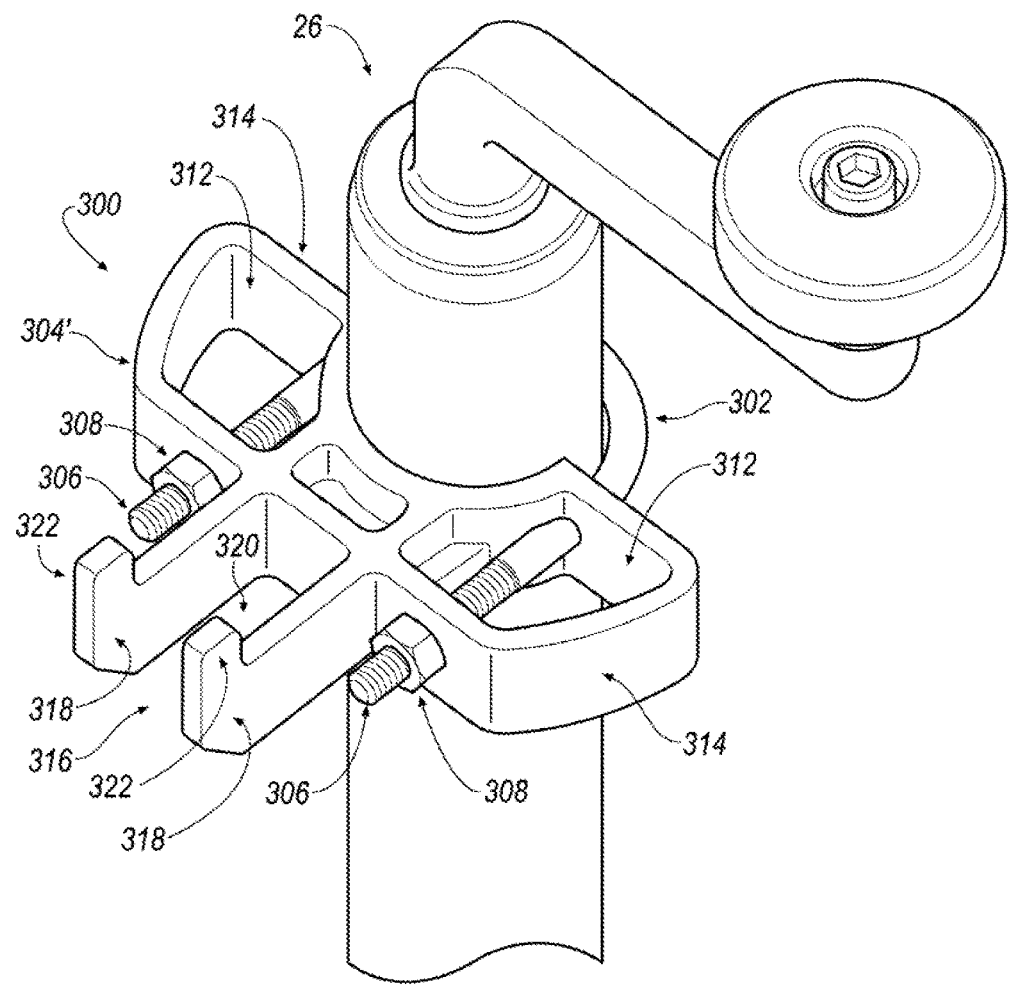
FIG. 19 generally illustrates a perspective view of an embodiment of a chain holder embodying principles of the present disclosure.

In embodiments, a chain holder 300 may include a holding portion 304', such as is generally illustrated in FIG. 19. The holding portion 304' may include one or more apertures 312. One or more of the apertures 312 may be configured to receive and/or hold at least a portion of a trailer chain 82. An attachment portion 86 associated with a trailer chain 82 may engage, be attached to, and/or be connected to a portion an aperture 312. For example, and without limitation, the attachment portion 86 may include a hook and/or a clip. The hook and/or clip may be hooked and/or clipped to an edge or wall 314 of an aperture 312. The wall 314 may retain an attachment portion 86 and/or limit movement of an attachment portion 86.

In embodiments, the holding portion 304' may include a plug holder 316. The plug holder 316 may be configured to hold and/or retain an electrical plug, such as an electrical plug 84. In embodiments, the plug holder 316 may include one or more sides 318. The sides 318 may form an opening 320. The opening 320 may be configured to receive a portion of an electrical plug 84. In embodiments, the opening 320 may comprise a dimension that is slightly larger than a portion of an electrical plug 84, such that, the portion of the electrical plug 84 may fit snug within the opening 320. The plug holder 316 may include one or more front stops 322. One or more of the front stops 322 may extend upward and away from a portion of a side 318. One or more of the front stops 322 may prevent and/or limit withdrawal of the electrical plug 84 from the opening 320.

Figure 20:
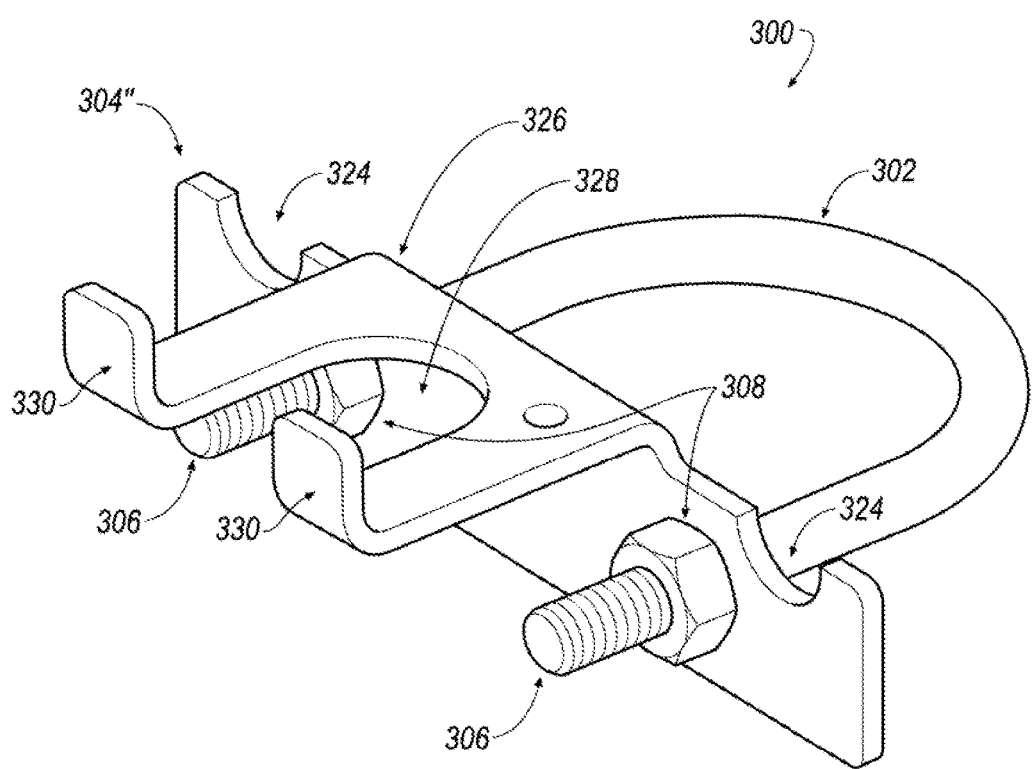
FIG. 20 generally illustrates a perspective view of an embodiment of a chain holder embodying principles of the present disclosure.
Figure 21A:
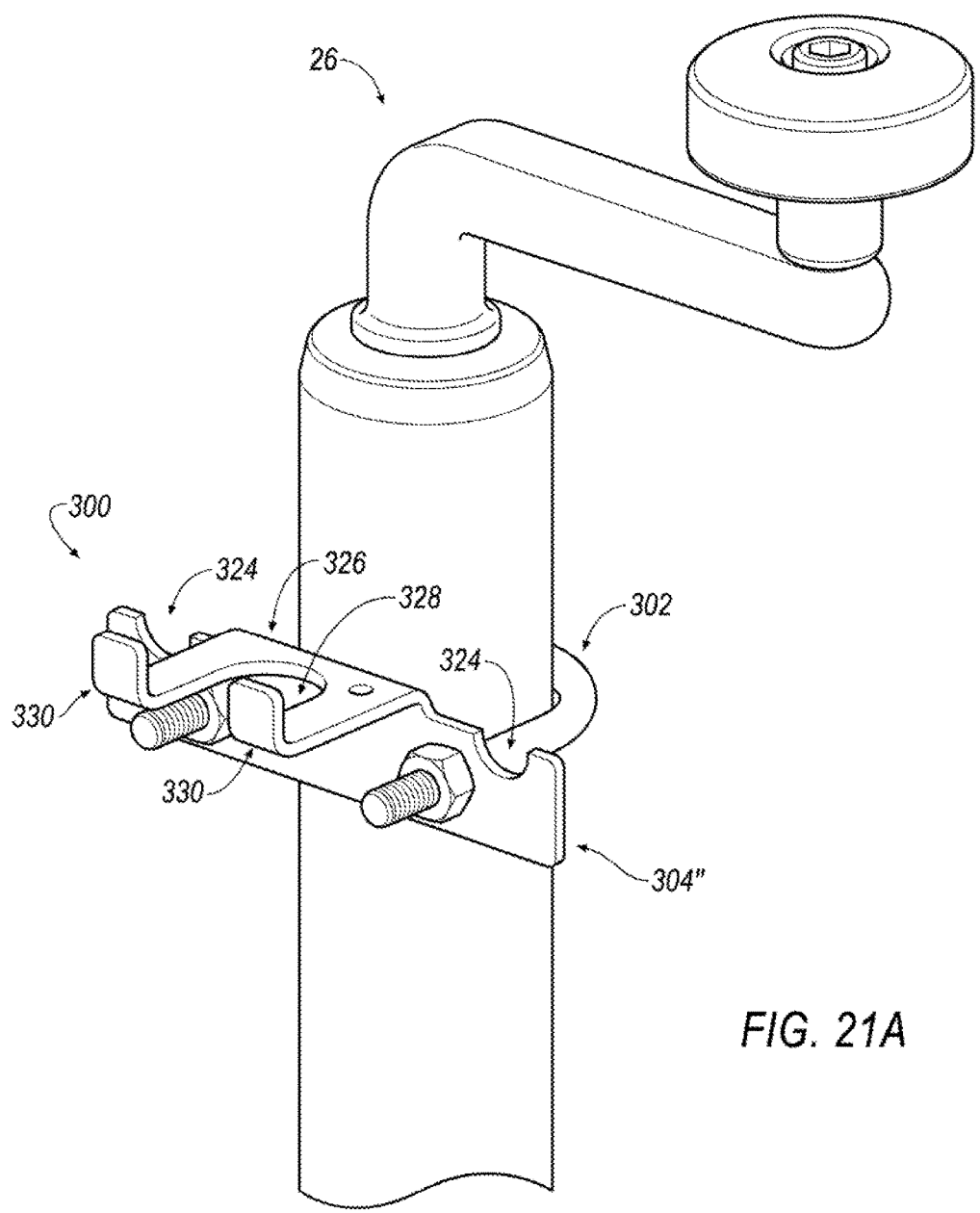
FIG. 21A generally illustrates a perspective view of a trailer lift including an embodiment of a chain holder embodying principles of the present disclosure.
Figure 21B:
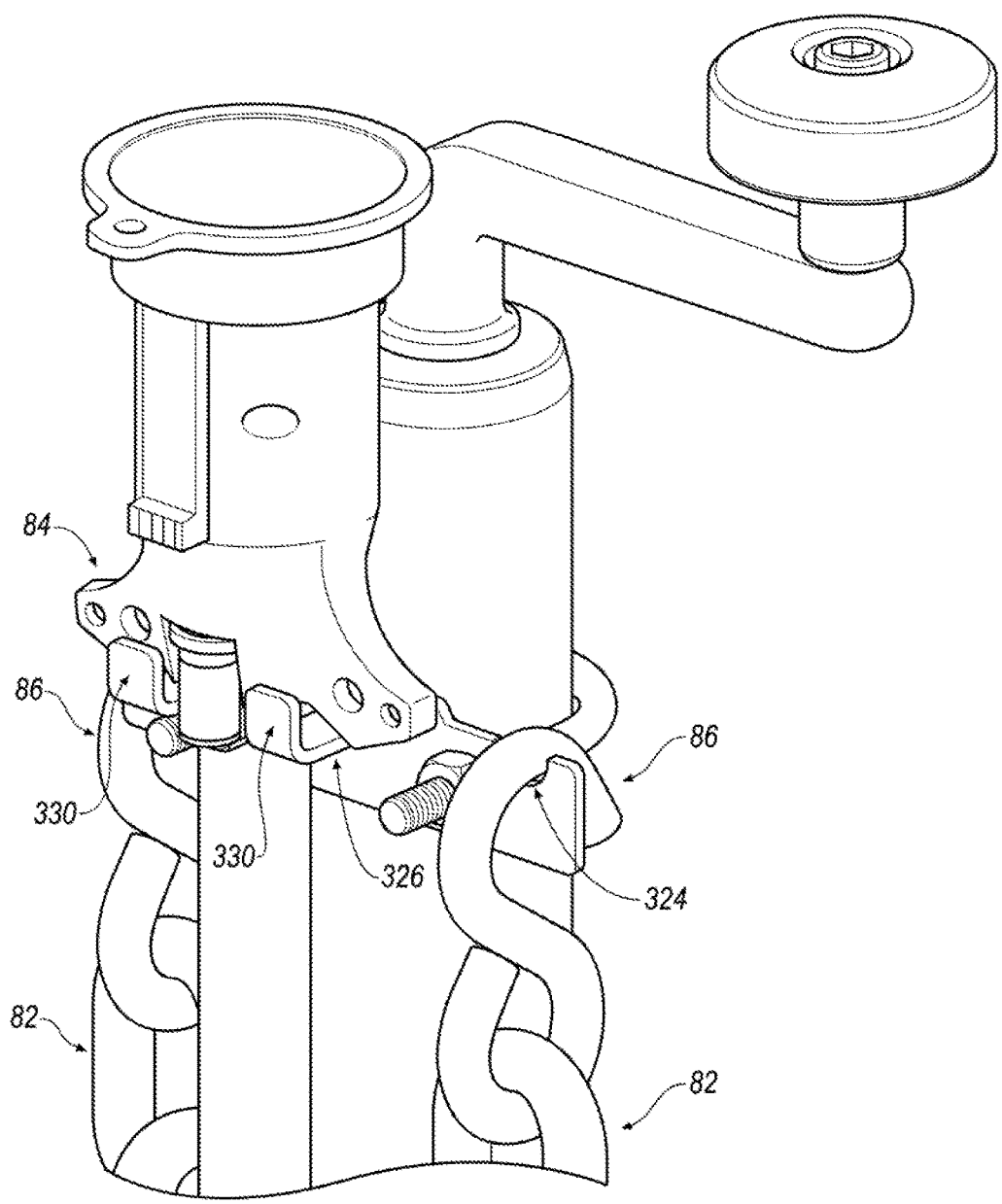
FIG. 21B generally illustrates a perspective view of a plurality of secondary connecting components connected to a chain holder of the type generally illustrated in FIG. 20.

In embodiments, a chain holder 300 may include a holding portion 304", such as is generally illustrated in FIGS. 20-21B. The holding portion 304" may, for example, include one or more cutouts or recesses 324. One or more of the recesses 324 may be configured to retain and/or hold a portion of a trailer chain 82. For example, and without limitation, a recess 324 may be configured to receive an attachment portion 86, such as is generally illustrated in FIG. 21B.

In embodiments, the holding portion 304" may include a plug holder 326. The plug holder 326 may include an opening 328. The opening 328 may be configured to receive a portion of an electrical plug 84, such as is generally illustrated in FIG. 21B. The opening 328 may comprise a dimension that is slightly larger than a portion of an electrical plug 84. The plug holder 326 may include one or more front stops 330. One or more of the front stops 330 may extend upward and away from a portion of the plug holder 326. One or more of the front stops 330 may be configured to prevent and/or limit movement and/or withdrawal of an electrical plug 84.

Various embodiments are described herein to various apparatuses, systems, and/or methods. Numerous specific details are set forth to provide a thorough understanding of the overall structure, function, manufacture, and use of the embodiments as described in the specification and illustrated in the accompanying drawings. It will be understood by those skilled in the art, however, that the embodiments may be practiced without such specific details. In other instances, well-known operations, components, and elements have not been described in detail so as not to obscure the embodiments described in the specification. Those of ordinary skill in the art will understand that the embodiments described and illustrated herein are non-limiting examples, and thus it can be appreciated that the specific structural and functional details disclosed herein may be representative and do not necessarily limit the scope of the embodiments.

Reference throughout the specification to "various embodiments," "some embodiments," "one embodiment," or "an embodiment," or the like, means that a particular feature, structure, or characteristic described in connection with the embodiment is included in at least one embodiment. Thus, appearances of the phrases "in various embodiments," "in some embodiments," "in one embodiment," or "in an embodiment," or the like, in places throughout the specification are not necessarily all referring to the same embodiment. Furthermore, the particular features, structures, or characteristics may be combined in any suitable manner in one or more embodiments. Thus, the particular features, structures, or characteristics illustrated or described in connection with one embodiment may be combined, in whole or in part, with the features, structures, or characteristics of one or more other embodiments without limitation given that such combination is not illogical or non-functional.

Although only certain embodiments have been described above with a certain degree of particularity, those skilled in the art could make numerous alterations to the disclosed embodiments without departing from the scope of this disclosure. Joinder references (e.g., attached, coupled, connected, and the like) are to be construed broadly and may include intermediate members between a connection of elements, relative movement between elements, physical connections (e.g., fluid connections), and/or electrical connections (wired and/or wireless). As such, joinder references do not necessarily imply that two elements are directly connected/coupled and in fixed relation to each other. The use of "e.g." throughout the specification is to be construed broadly and is used to provide non-limiting examples of embodiments of the disclosure, and the disclosure is not limited to such examples. It is intended that all matter contained in the above description or shown in the accompanying drawings shall be interpreted as illustrative only and not limiting. Changes in detail or structure may be made without departing from the present disclosure.

What is claimed is:

1. A holder for holding or retaining trailer components, the holder comprising:
   a first portion configured to receive at least a portion of at least one secondary connecting component of a trailer;
   a second portion configured to engage at least a portion of the first portion; and
   a plurality of connectors configured to connect the second portion to the first portion, wherein the first portion and the second portion are configured to form an aperture comprising at least one radiused portion disposed on one of a rear side of the first portion and a side of the second portion that faces the rear side of the first portion, the aperture being configured to substantially surround a lift mechanism shaft;
   wherein the first portion is substantially planar.

2. The holder of claim 1, wherein each of the connectors are configured to extend from one of the first portion and second portion and into the other of the first portion and the second portion.

3. The holder of claim 1, wherein the at least one secondary connecting component of said trailer includes a trailer chain.

4. The holder of claim 1, wherein the first portion includes a polymer material.

5. The holder of claim 1, wherein the first portion includes a plurality of recesses or holes, each recess or hole configured to receive a respective secondary connecting component of the at least one secondary connecting component; and the first portion includes a cutaway portion configured to receive a portion of an electrical plug.

6. A system for holding or retaining trailer components, the system comprising:
   a trailer lift for a trailer; and
   the holding portion of claim 1.

7. The system of claim 6, wherein the holding portion is formed as a unitary component of the trailer lift.

8. The system of claim 6, wherein the holding portion is connected to a portion of the trailer lift.

9. The system of claim 8, wherein the holding portion is welded to a portion of the trailer lift.

10. The system of claim 6, wherein the holding portion includes a polymer material.

11. The system of claim 6, wherein the at least one secondary connecting component of said trailer includes a trailer chain.

12. The system of claim 6, wherein the holding portion includes a cutaway portion.

13. The system of claim 12, wherein the cutaway portion is configured to receive a portion of an electrical plug.

14. A holder for holding or retaining trailer components, the holder comprising:
   a first portion configured to receive at least a portion of a first secondary connecting component of a trailer;
   a second portion configured to engage at least a portion of the first portion; and
   a plurality of connectors configured to connect the second portion to the first portion, wherein the first portion and the second portion are configured to form an aperture comprising at least one radiused portion disposed on one of a rear side of the first portion and a side of the second portion that faces the rear side of the first portion, the aperture being configured to substantially surround a lift mechanism shaft;
   wherein the first portion includes a cutaway portion that is configured to receive a second secondary connecting component of said trailer and the second secondary connecting component includes an electrical plug associated with said trailer.

15. The holder of claim 14, wherein the cutaway portion is disposed on a front side of the first portion, wherein the cutaway portion extends to an edge of the first portion.

16. A holder for holding or retaining trailer components, the holder comprising:
   a first portion configured to receive at least a portion of at least one secondary connecting component of a trailer;
   a second portion configured to engage at least a portion of the first portion; and
   a plurality of connectors configured to connect the second portion to the first portion, wherein the first portion and the second portion are configured to form an aperture comprising at least one radiused portion disposed on one of a rear side of the first portion and a side of the second portion that faces the rear side of the first portion, the aperture being configured to substantially surround a lift mechanism shaft;
   wherein the first portion includes a plurality of holes each configured to receive a secondary connecting component of the at least one secondary connecting component, and the plurality of holes includes at least three holes.

17. The holder of claim 16, wherein the plurality of holes are disposed on a top side of the first portion a predetermined distance away from a front side of the first portion.

18. A holder for holding or retaining trailer components, the holder comprising:
- a first portion configured to receive at least a portion of at least one secondary connecting component of a trailer;
- a second portion configured to engage at least a portion of the first portion;
- a plurality of connectors configured to connect the second portion to the first portion, wherein the first portion and the second portion are configured to form an aperture comprising at least one radiused portion disposed on one of a rear side of the first portion and a side of the second portion that faces the rear side of the first portion, the aperture being configured to substantially surround a lift mechanism shaft; and
- a cutaway portion disposed on the first portion, wherein the cutaway portion is configured to receive an electrical plug associated with the trailer, and wherein the cutaway portion includes a receiving portion disposed on a front side of the first portion and an electrical plug retaining portion disposed adjacent to the receiving portion, the electrical plug retaining portion being configured to retain the electrical plug within the cutaway portion.

19. The holder of claim 18, wherein the electrical plug retaining portion comprises an L-shaped recess disposed adjacent to the receiving portion.

20. The holder of claim 18, wherein the electrical plug retaining portion comprises at least a partial circle having a diameter that is slightly larger than a diameter of a portion of the electrical plug.

* * * * *